May 19, 1970     M. T. MOLDOVAN, JR     3,512,707
VOTING MACHINE
Filed Jan. 10, 1968     22 Sheets-Sheet 1
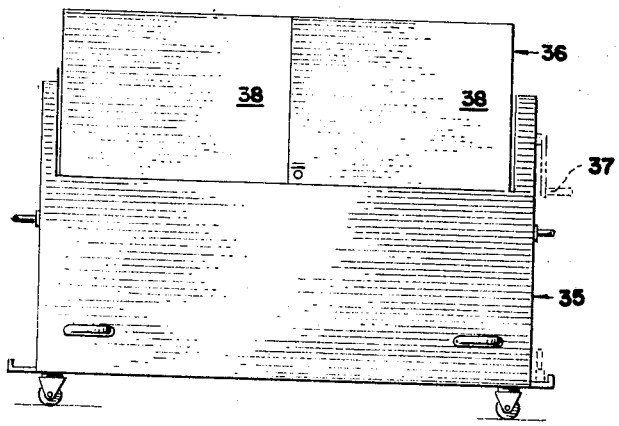
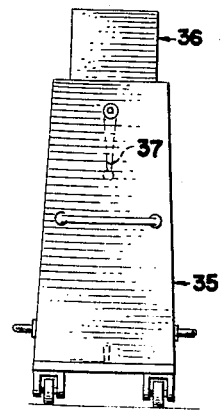
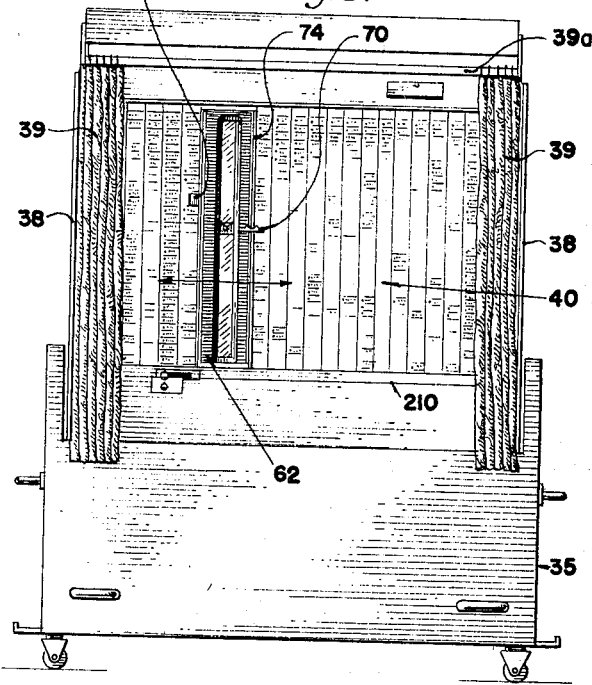
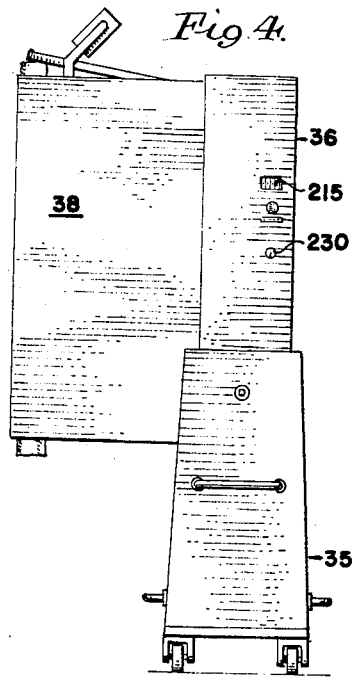
INVENTOR.
BY MICHAEL TERRANCE MOLDOVAN, JR.
*Bean & Bean*
ATTORNEYS

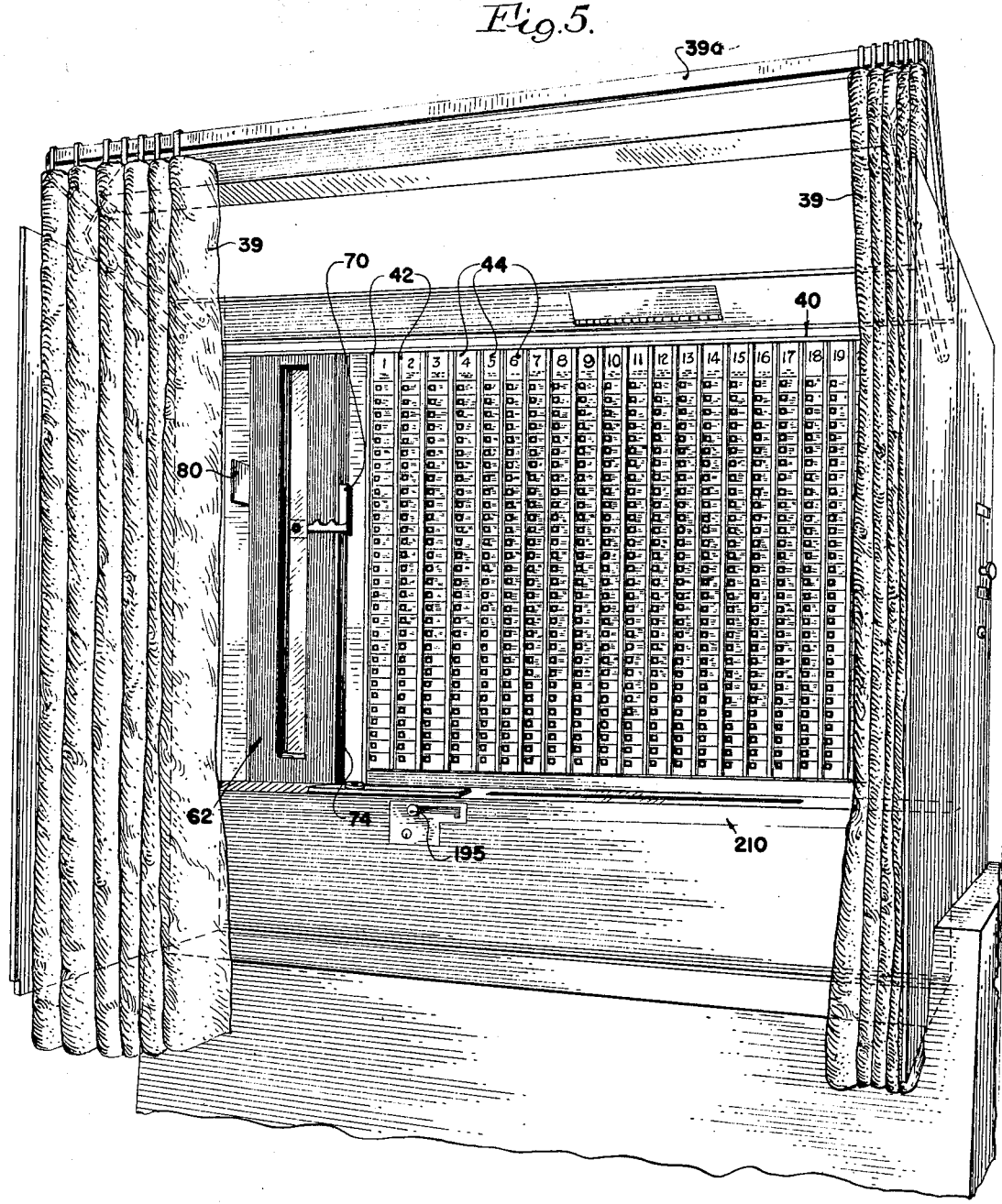

May 19, 1970      M. T. MOLDOVAN, JR      3,512,707
VOTING MACHINE
Filed Jan. 10, 1968      22 Sheets-Sheet 3
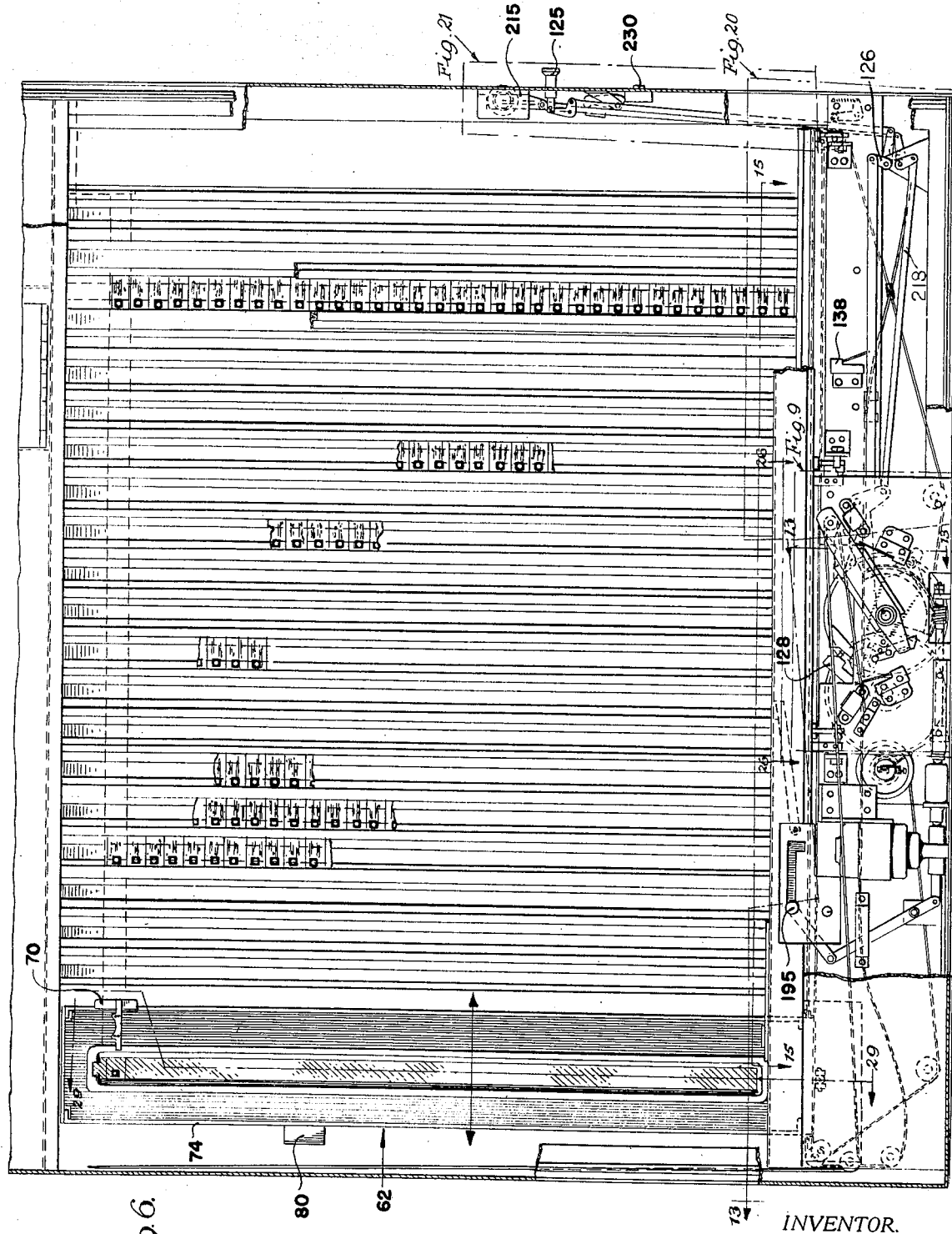
INVENTOR.
BY MICHAEL TERRANCE MOLDOVAN, JR.
Bean & Bean
ATTORNEYS

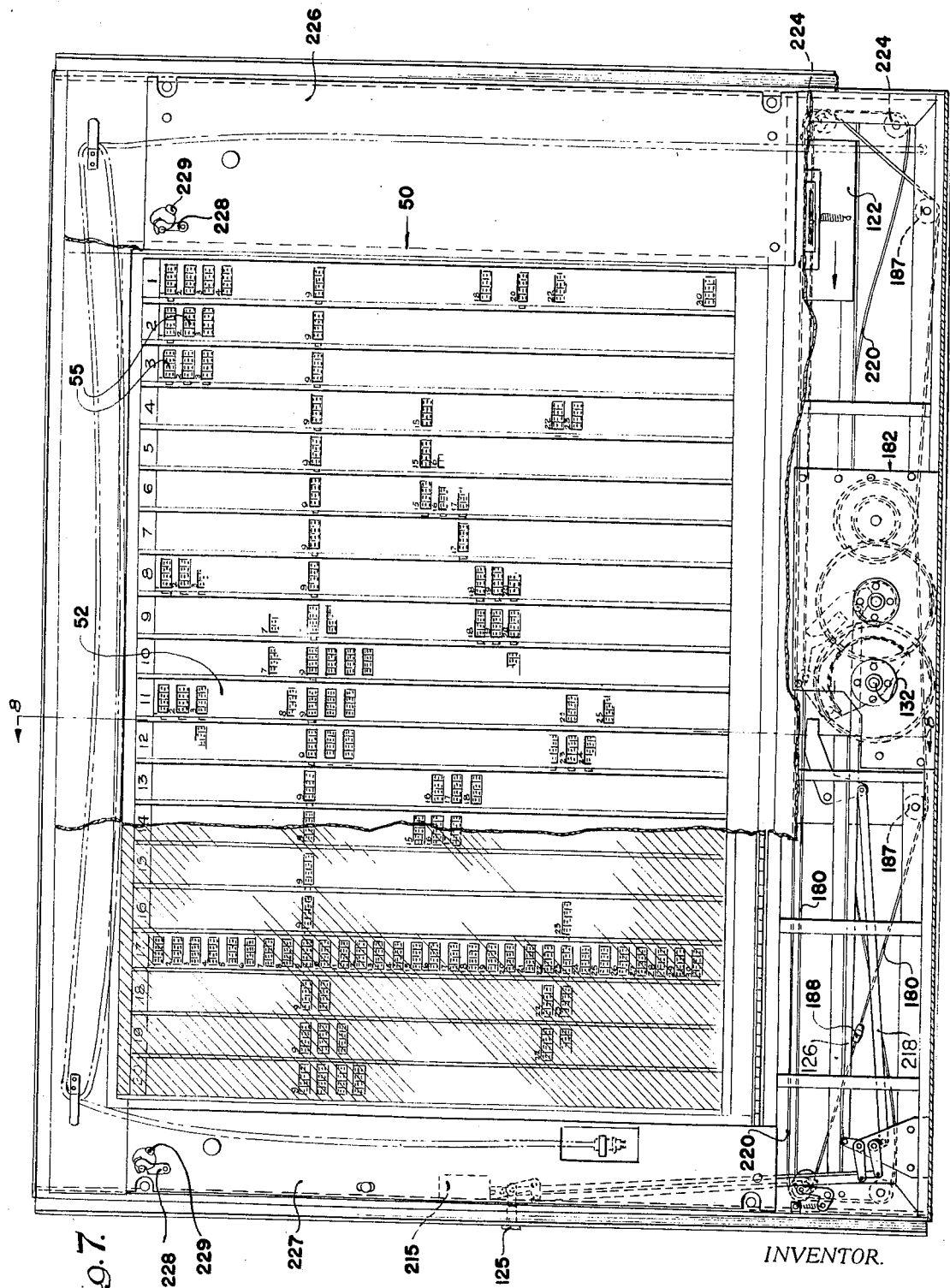

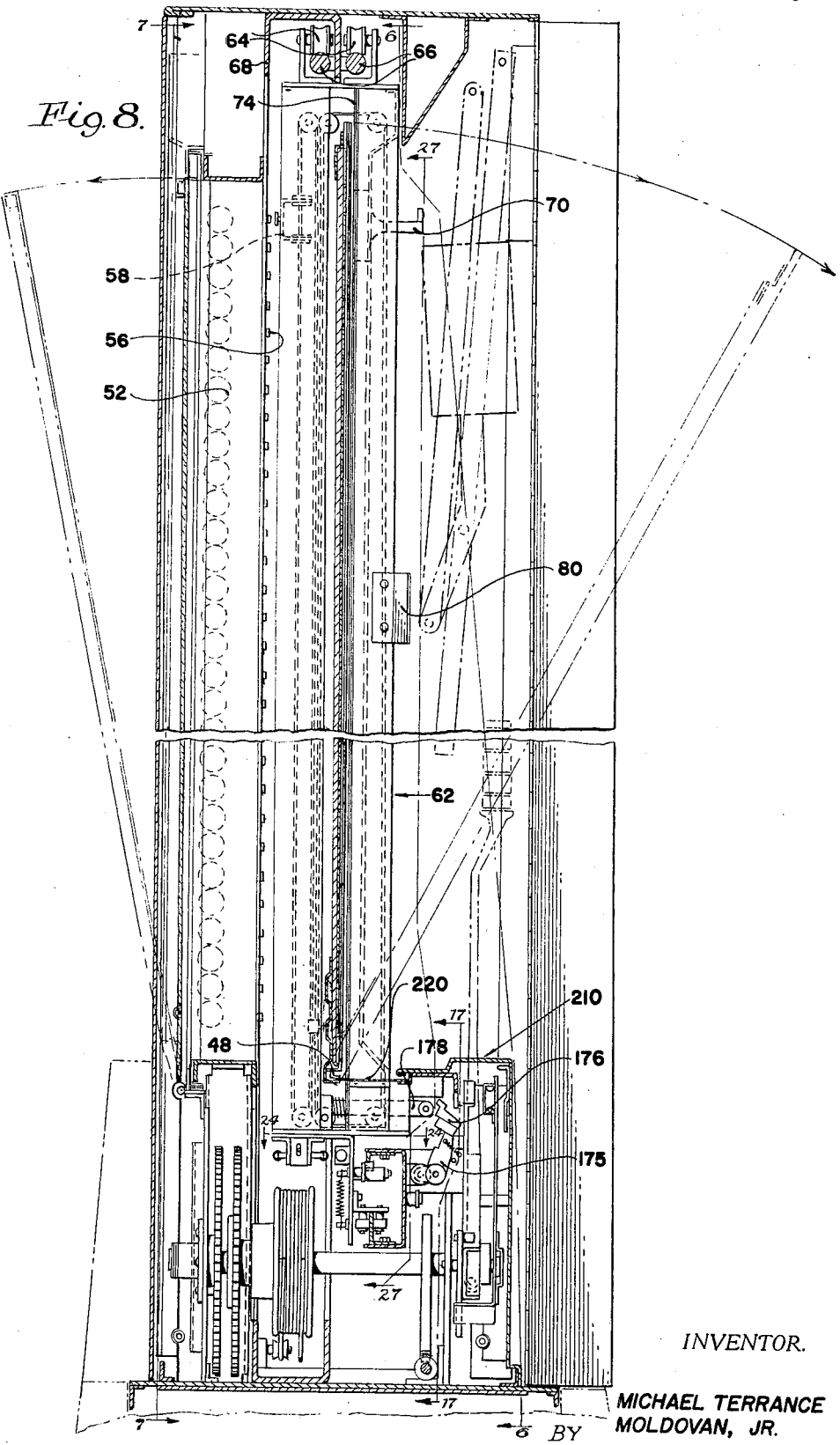

May 19, 1970     M. T. MOLDOVAN, JR     3,512,707
VOTING MACHINE
Filed Jan. 10, 1968     22 Sheets-Sheet 6
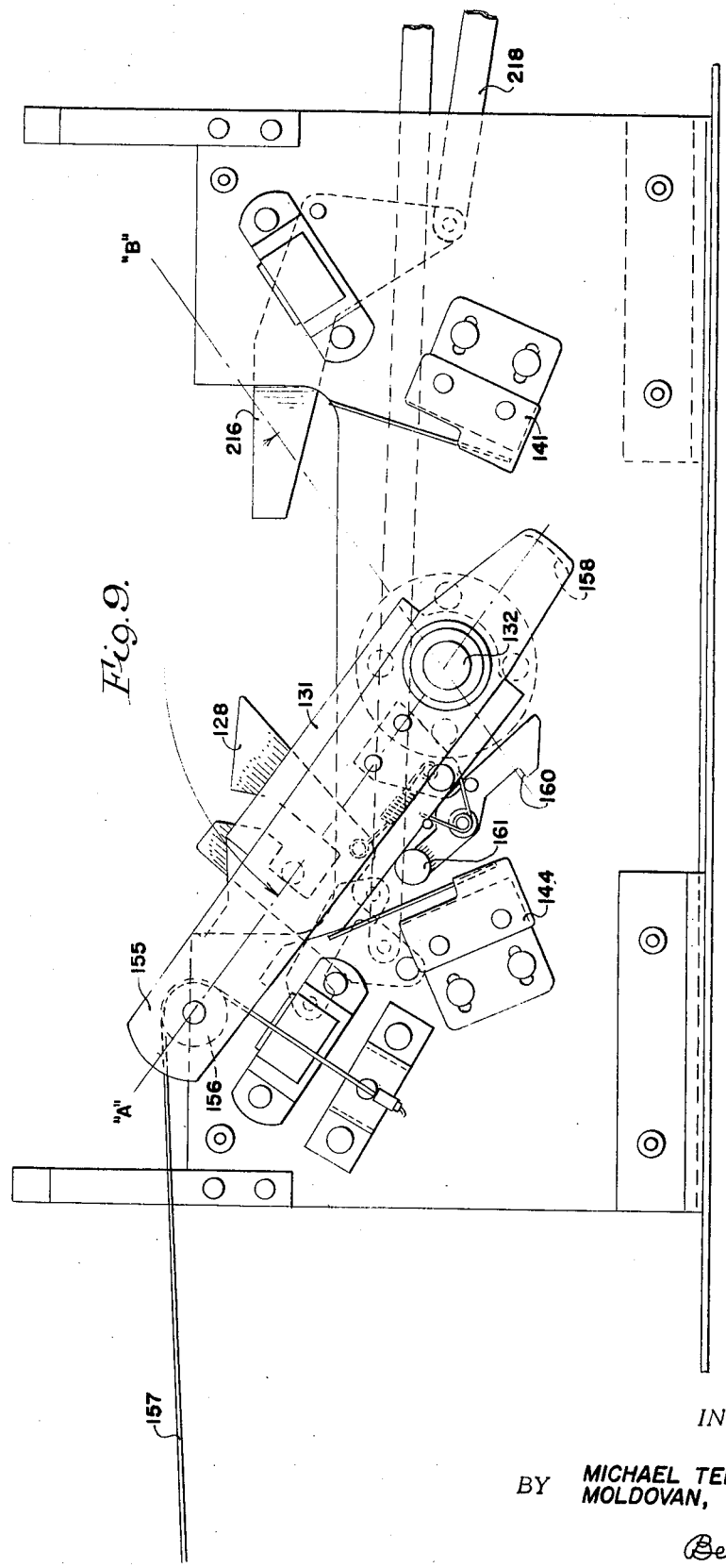
INVENTOR.
BY MICHAEL TERRANCE MOLDOVAN, JR.
*Bean & Bean*
ATTORNEYS

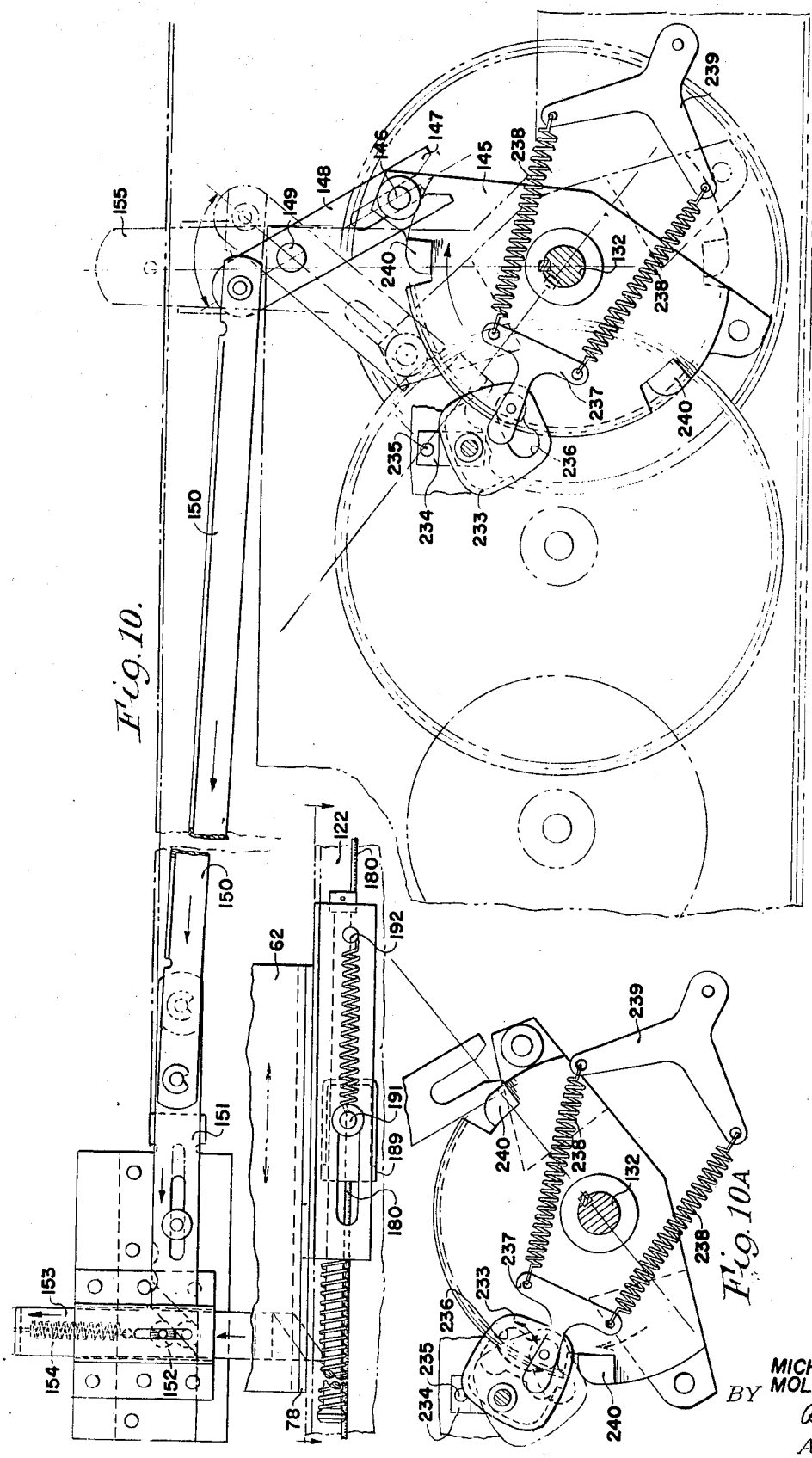

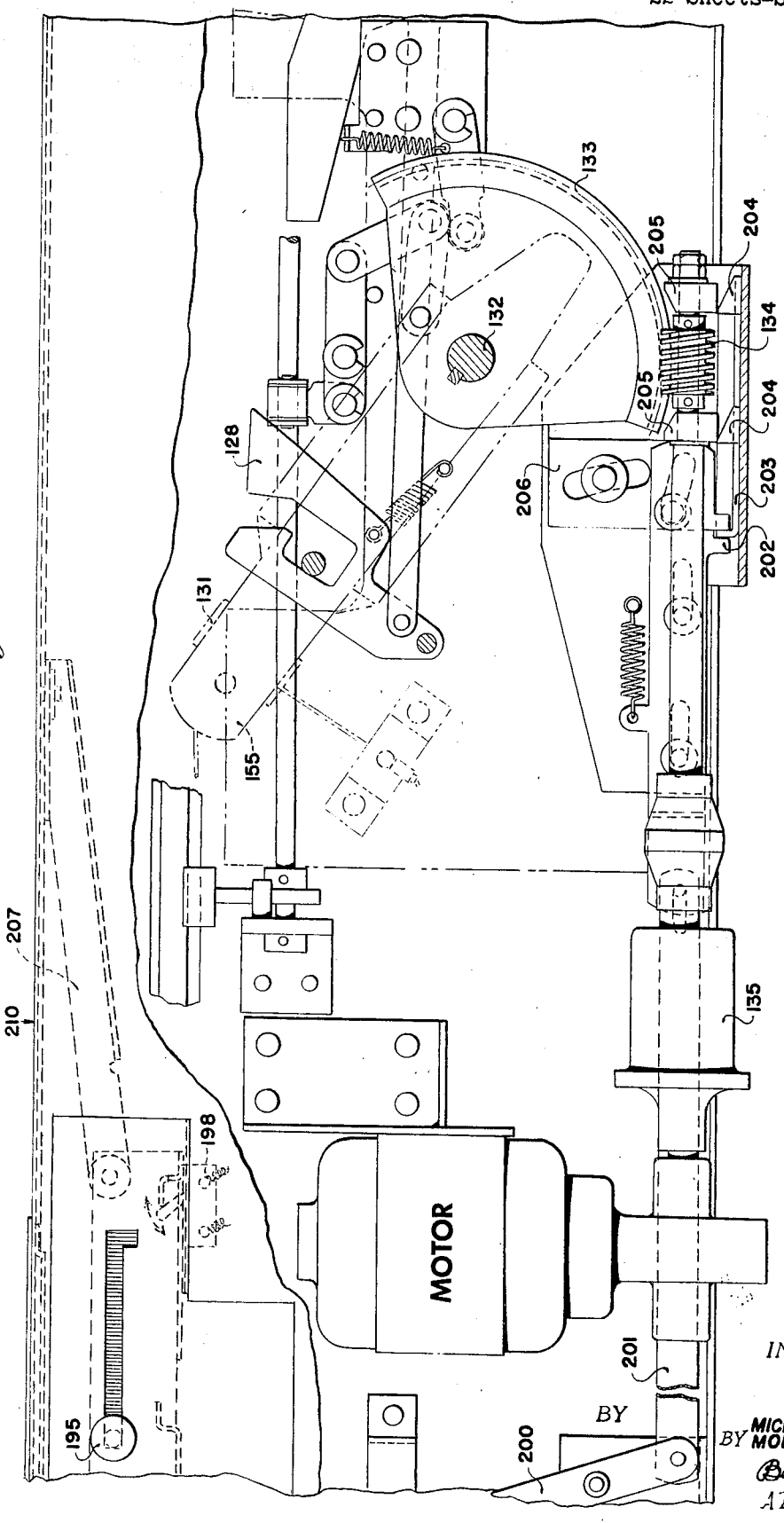

May 19, 1970  M. T. MOLDOVAN, JR  3,512,707
VOTING MACHINE
Filed Jan. 10, 1968  22 Sheets-Sheet 9
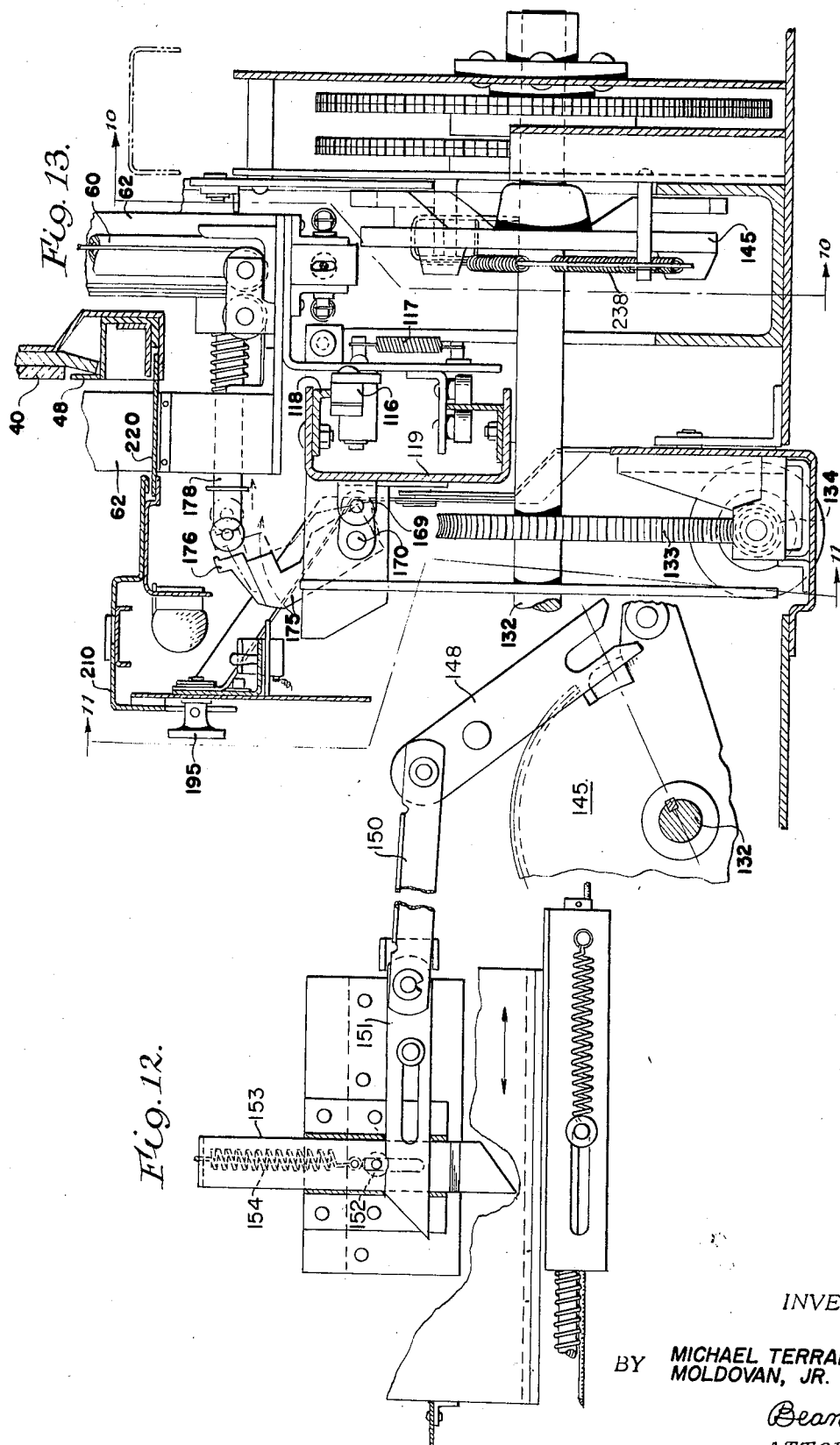
INVENTOR.
MICHAEL TERRANCE
BY MOLDOVAN, JR.
Bean & Bean
ATTORNEYS May 19, 1970 M. T. MOLDOVAN, JR 3,512,707
VOTING MACHINE Filed Jan. 10, 1968 22 Sheets-Sheet 10

INVENTOR.
MICHAEL TERRANCE
BY MOLDOVAN, JR.

Bean & Bean
ATTORNEYS

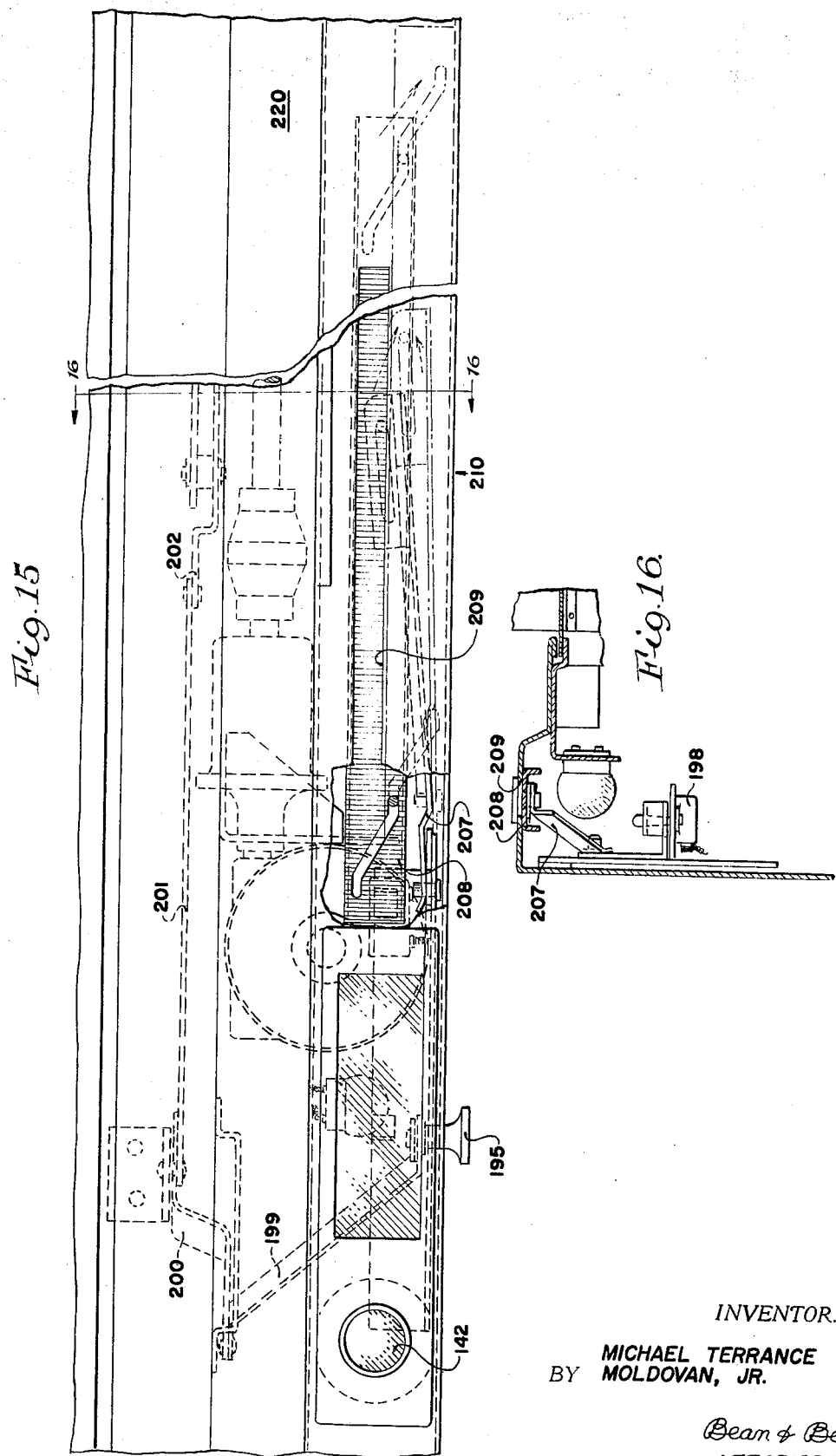

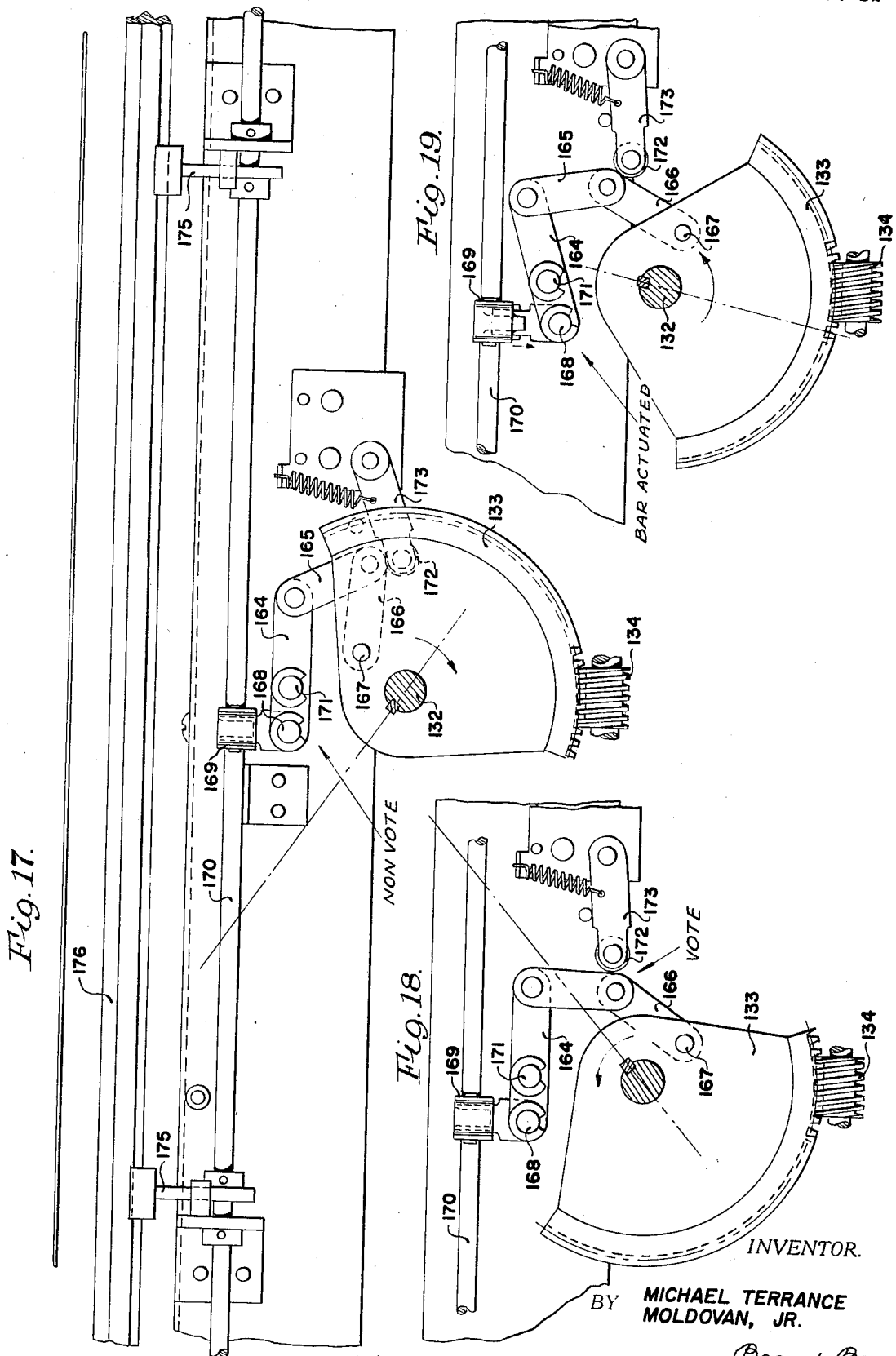

May 19, 1970   M. T. MOLDOVAN, JR   3,512,707
VOTING MACHINE
Filed Jan. 10, 1968   22 Sheets-Sheet 13
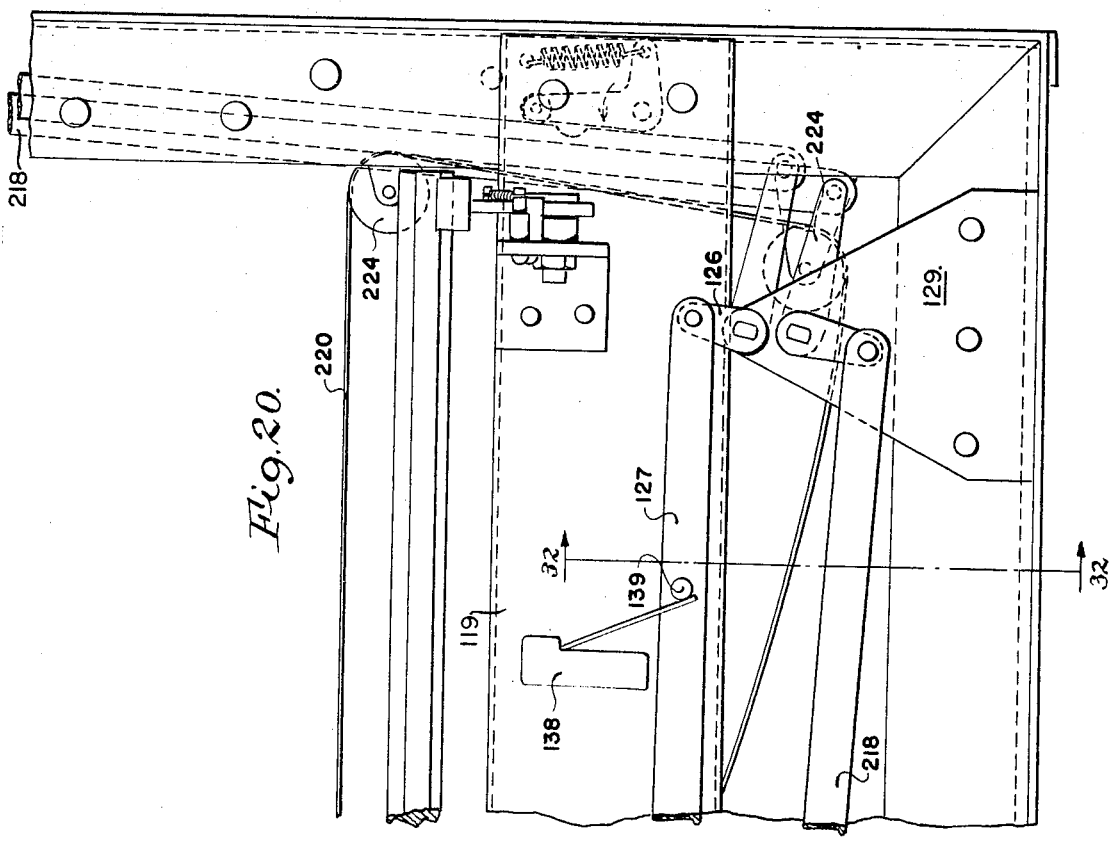
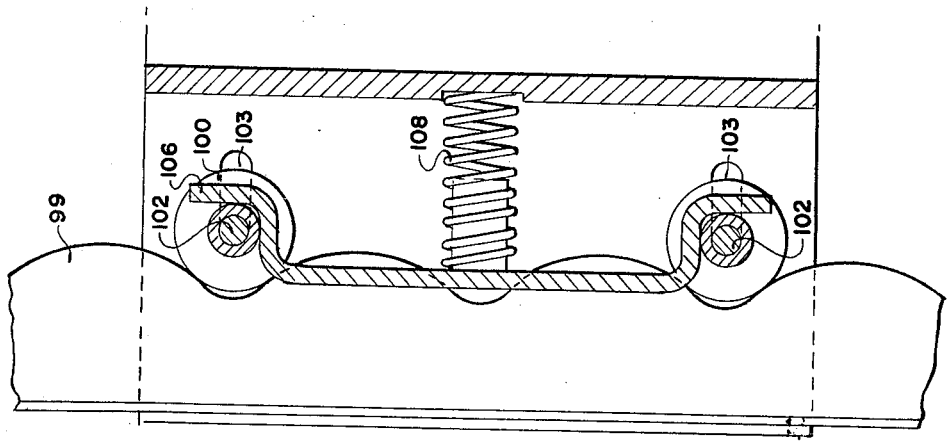
INVENTOR.
MICHAEL TERRANCE
BY  MOLDOVAN, JR.
Bean & Bean
ATTORNEYS

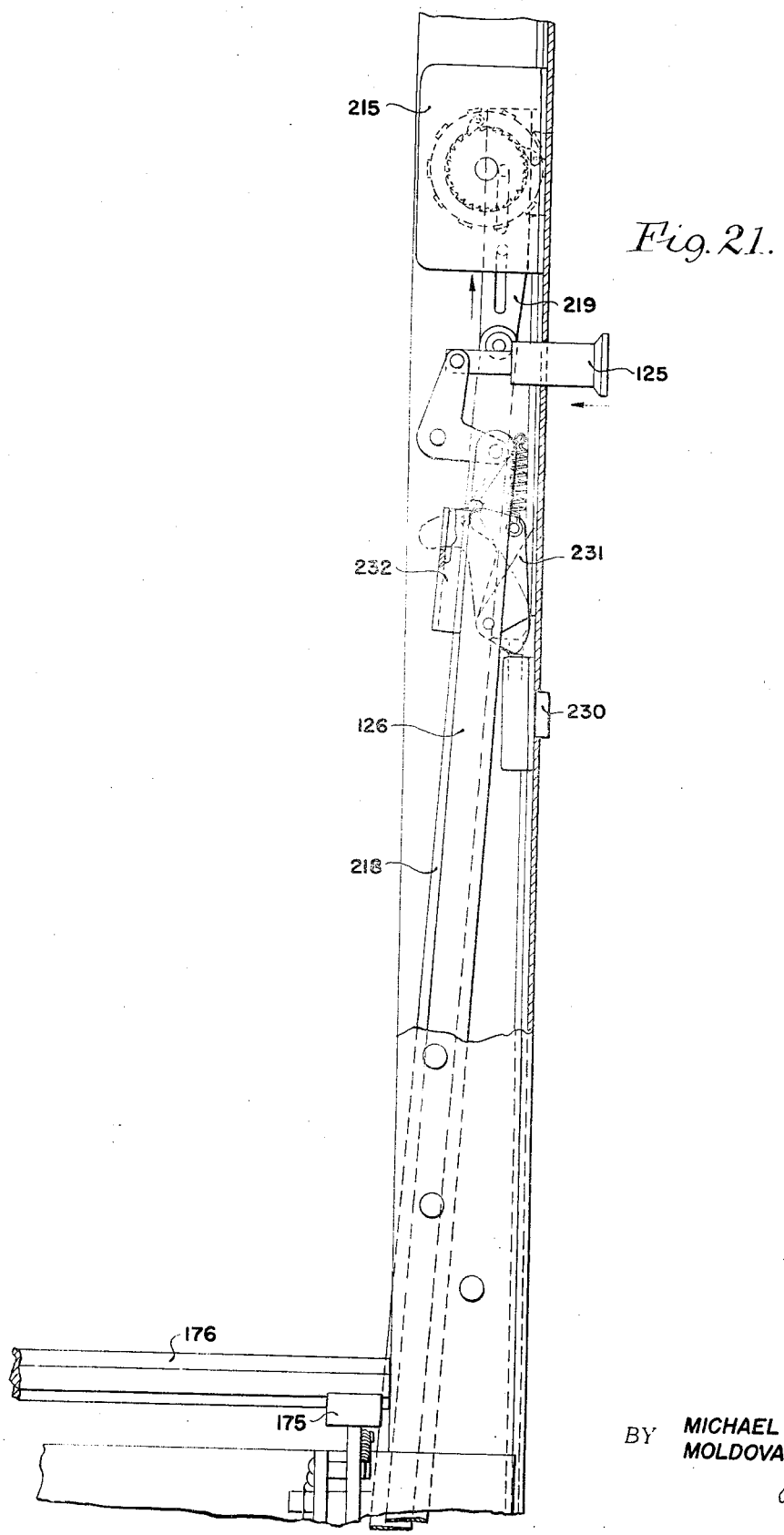

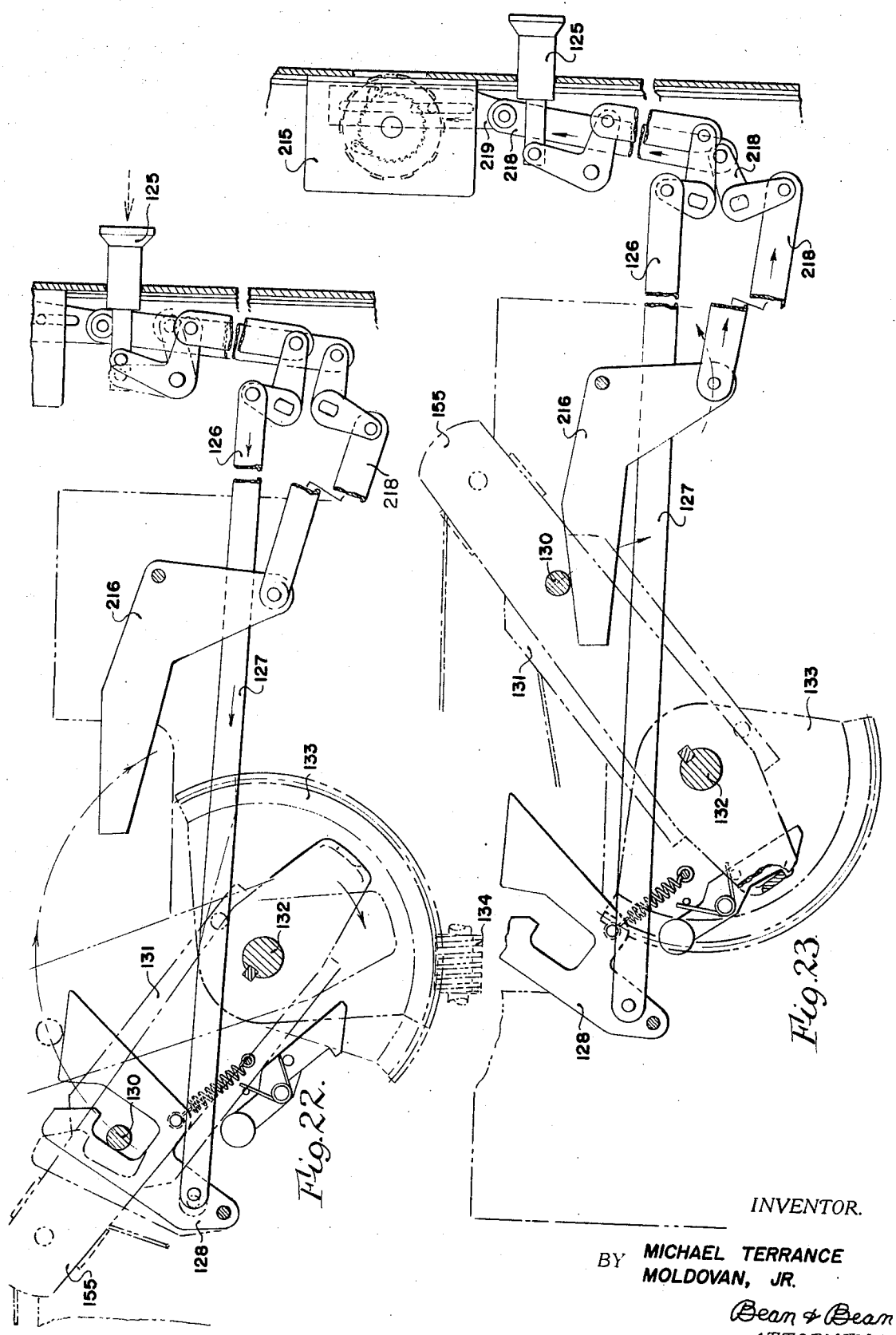

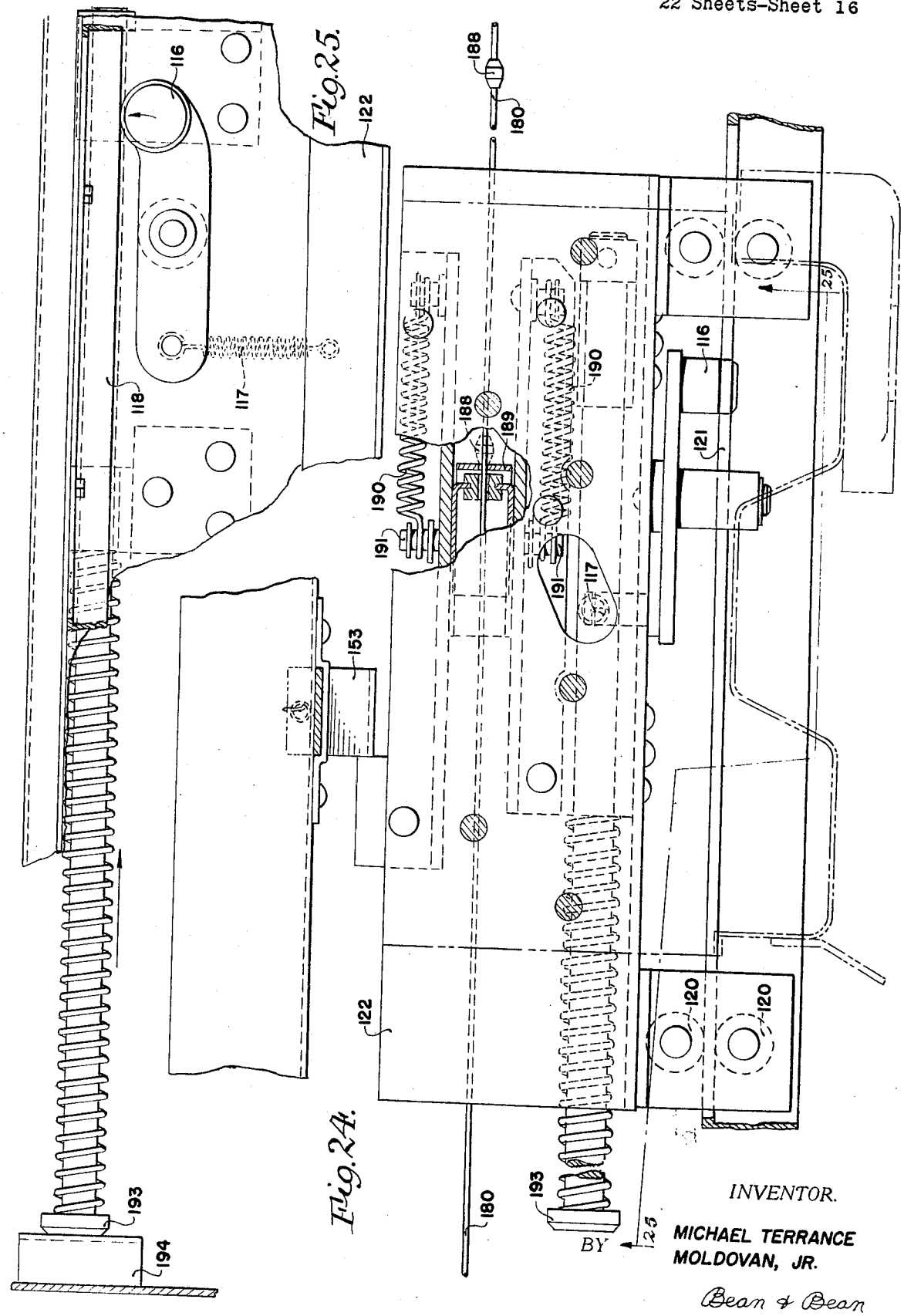

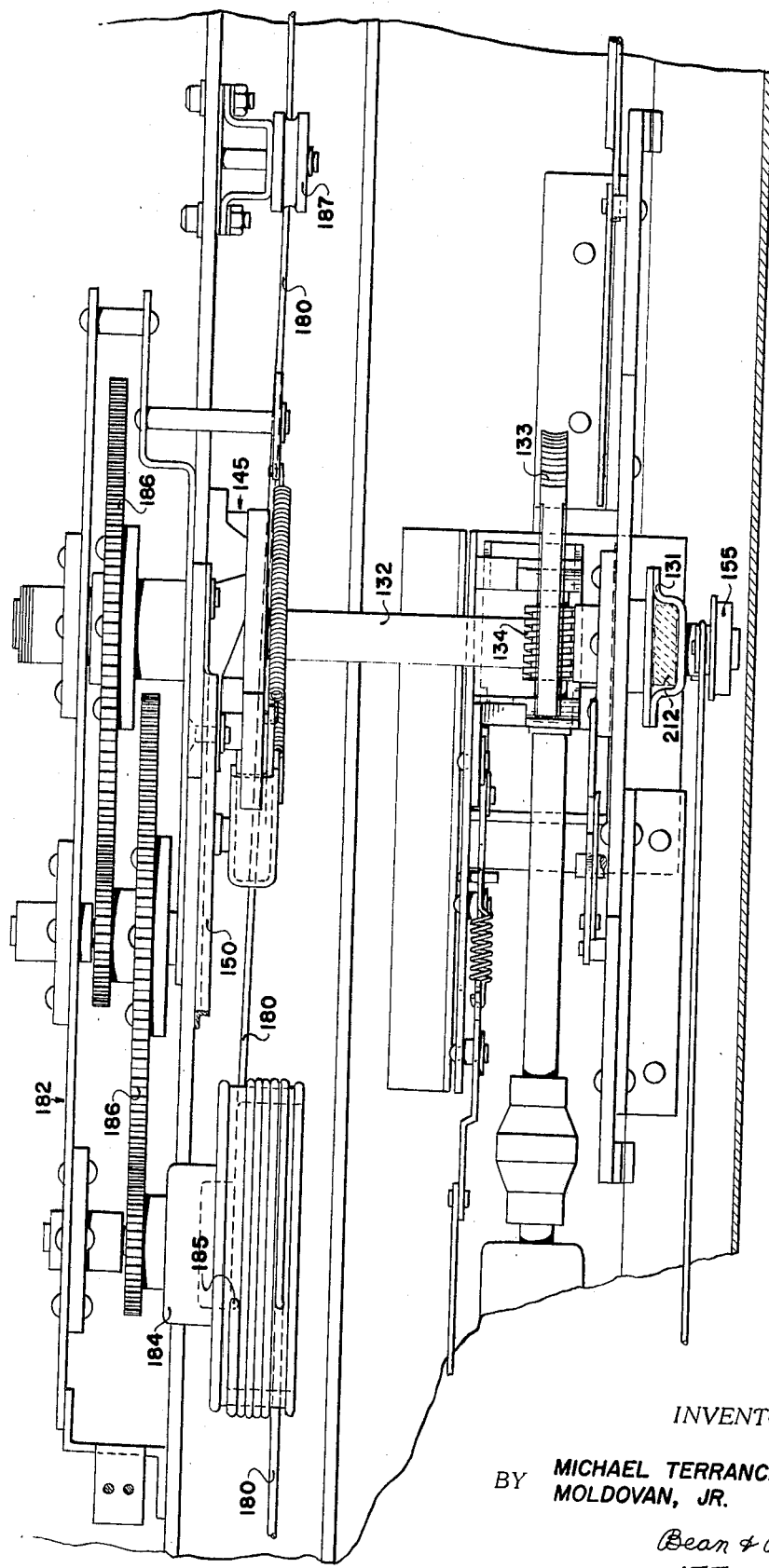

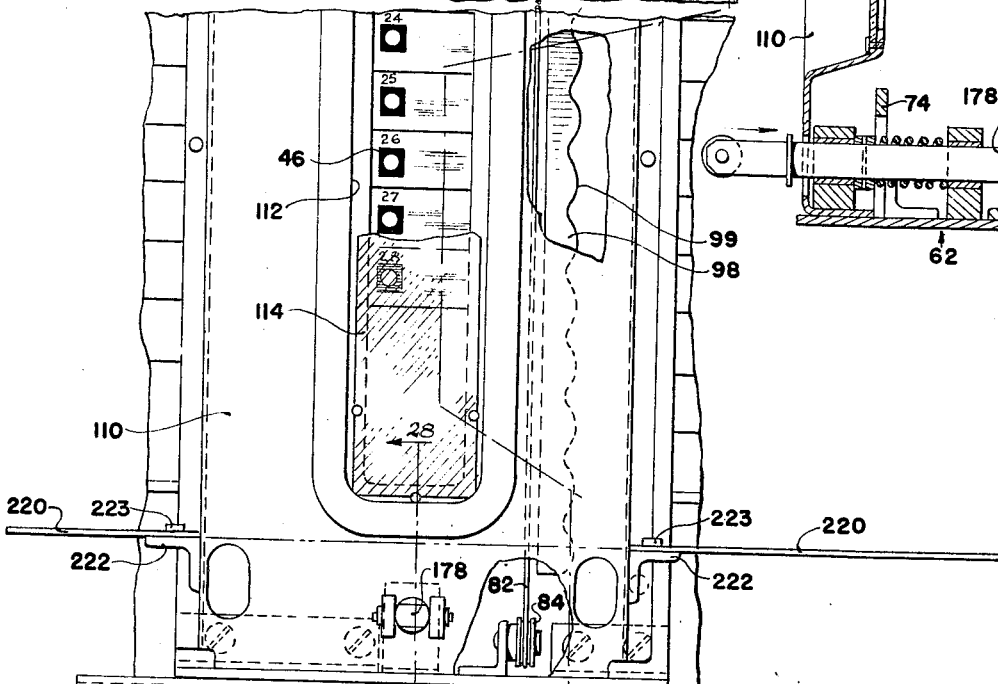

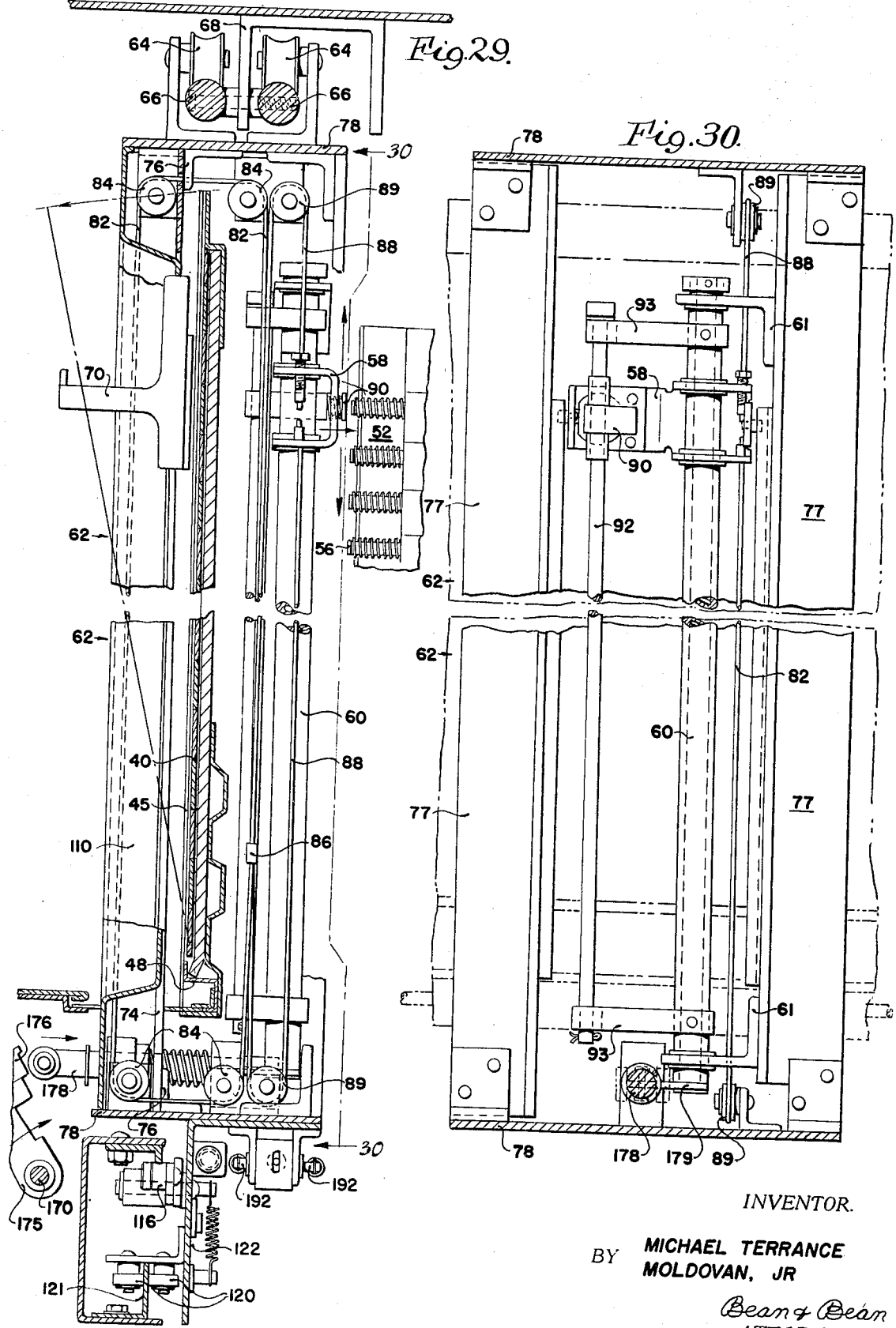

May 19, 1970    M. T. MOLDOVAN, JR    3,512,707

VOTING MACHINE

Filed Jan. 10, 1968    22 Sheets-Sheet 20

INVENTOR.

BY  MICHAEL TERRANCE
    MOLDOVAN JR.

Bean & Bean
ATTORNEYS

May 19, 1970     M. T. MOLDOVAN, JR     3,512,707

VOTING MACHINE

Filed Jan. 10, 1968     22 Sheets-Sheet 21

INVENTOR.

MICHAEL TERRANCE
MOLDOVAN, JR.

BY

Bean & Bean
ATTORNEYS

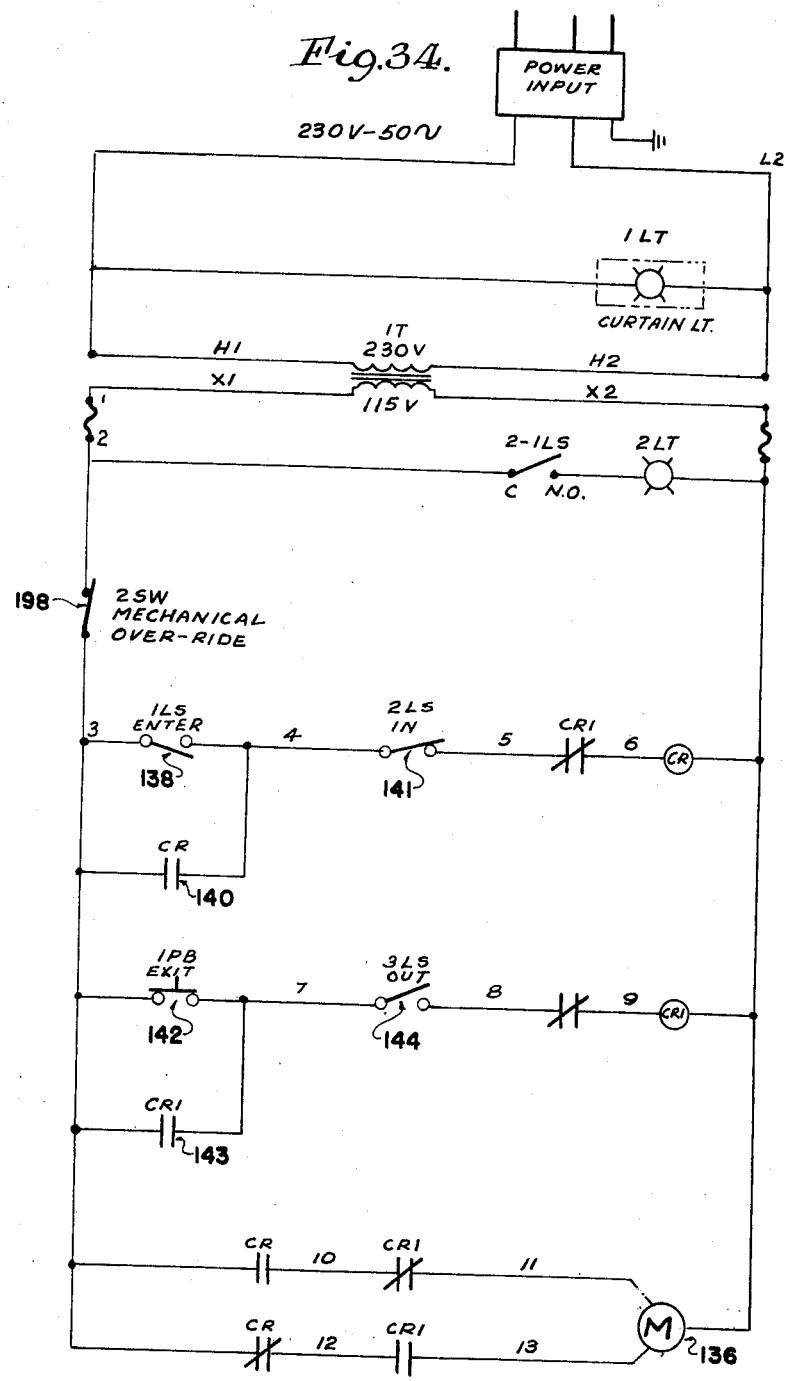

United States Patent Office 3,512,707
Patented May 19, 1970

3,512,707
VOTING MACHINE
Michael Terrance Moldovan, Jr., Jamestown, N.Y., assignor to AVM Corporation, Jamestown, N.Y.
Filed Jan. 10, 1968, Ser. No. 696,829
Int. Cl. G07c 13/00
U.S. Cl. 235—51                12 Claims

ABSTRACT OF THE DISCLOSURE

An improved voting machine embodying means facilitating the making of a single selection from a multitude of available choices on a ballot panel of a format which is familiar to persons having previously voted with paper ballots; the machine being readily adaptable to accommodate a large variety of voting procedure requirements. The machine presents to the voter a voting panel on which appear party and candidate listings in vertical and horizontal alignments, and an improved vote selection device and mechanism operably coupling it to the vote registering counters. The selector may be set and reset in voting position any number of times whereupon the machine will ultimately record only the final selection of the voter. The machine includes improved means insuring against tampering and/or fraudulent use of the machine, and complete secrecy and privacy for the voter throughout the voting operation.

BACKGROUND AND DETAILED DESCRIPTION OF THE INVENTION

The present invention relates to an improved voting machine of the type shown for example in U.S. Pat. 3,233,826; Belgium Patent 661,151; British Patent 1,022,-227 and Italian Patent 732,775.

The improved machine features a novel vote selection device; an improved selector on-target setting assist arrangement; and elimination of the selector "push-in" requirement for cocking the vote registering apparatus. Also, it embodies an improved control linkage and drive system for the vote registering counters and an improved electrical drive system (which is readily convertible to manual operation in event of power failure) for automatically registering a vote; returning the selector to non-voting position; and operating the secrecy curtains. The machine includes improved security and over-voting prevention provisions; and means facilitating "blank" or null voting, for use by a voter if he chooses not to vote for any listed candidate, while pretending to vote. Other features and advantages of the improved machine of this invention will appear from the description hereinbelow.

IN THE DRAWING

FIG. 1 is a front elevational view of a voting machine module of the present invention shown in lowered "storage" position within a transport-storage case therefor;

FIG. 2 is a side elevational view thereof;

FIG. 3 is a front view showing the machine in elevated "open" position, and ready to receive a voter;

FIG. 4 is a side view of the machine when "open" as shown in FIG. 3;

FIG. 5 is a close-up fragmentary front perspective view of the voting machine as illustrated in FIG. 3 and showing the voting panel as viewed by the voter when entering the machine;

FIG. 6 is an enlarged scale fragmentary front elevational view of the voting panel portion of the machine, with the operating gear cover removed to show the voting control mechanism;

FIG. 7 is a fragmentary rear elevational view of the machine, with the back cover removed and showing the totalizing counters exposed to view for canvassing by the election officials; and with a lower casing portion broken away to show operating mechanism;

FIG. 8 is a vertical sectional view, on enlarged scale, taken as suggested by line 8—8 of FIG. 7;

FIG. 9 is a horizontal sectional view on enlarged scale, taken as suggested by line 9—9 of FIG. 6, and showing the voting control mechanism in non-vote or locked out position;

FIG. 10 is a fragmentary section on enlarged scale, taken on line 10—10 of FIG. 13; showing the mechanism when the machine is being cycled from "non-vote" (locked) to "vote" (open) position;

FIG. 10A is a fragmentary view of a portion of FIG. 10 but showing a portion of the mechanism in the vote or "open" position;

FIG. 11 is a fragmentary sectional view taken on line 11—11 of FIG. 13;

FIG. 12 is a fragmentary view of a portion of the voting control mechanism and as shown in FIG. 10, but showing the mechanism when unlocked for a voting operation;

FIG. 13 is a fragmentary enlarged scale section taken as suggested along line 13—13 of FIG. 6;

FIG. 15 is a fragmentary section on enlarged scale taken as suggested by line 15—15 of FIG. 6;

FIG. 16 is a fragmentary section taken as suggested by line 16—16 of FIG. 15;

FIG. 17 is a fragmentary sectional view taken on line 17—17 of FIG. 8;

FIG. 18 is a view corresponding to a portion of FIG. 17, but illustrates the mechanism in the vote or "open" position;

Figure 31:
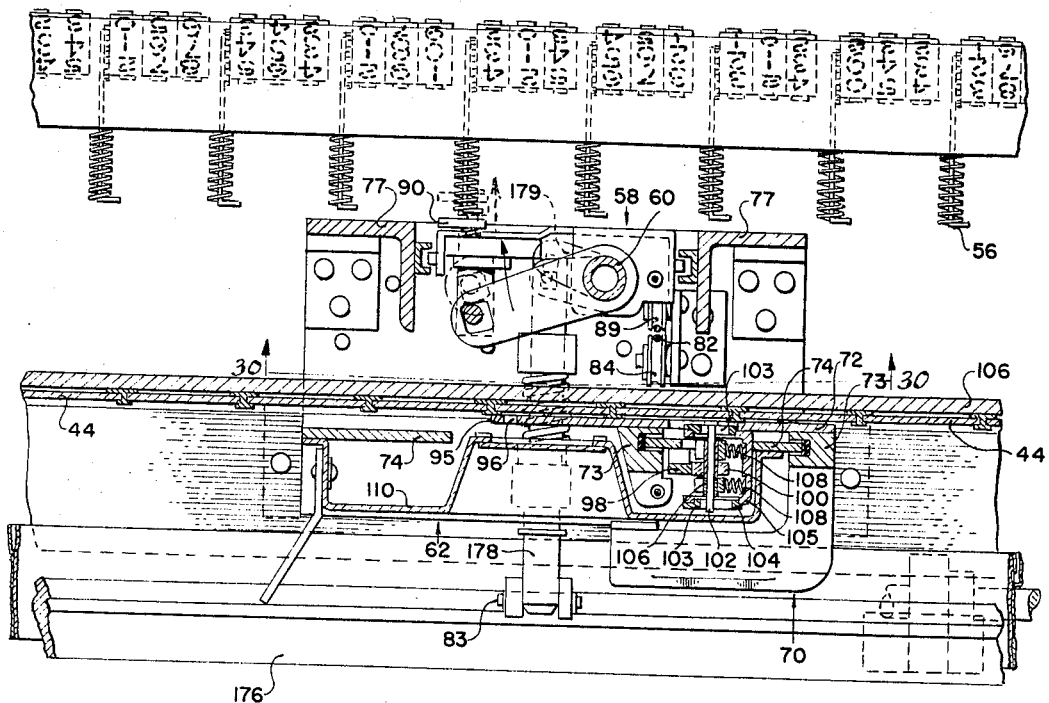
Figure 32:
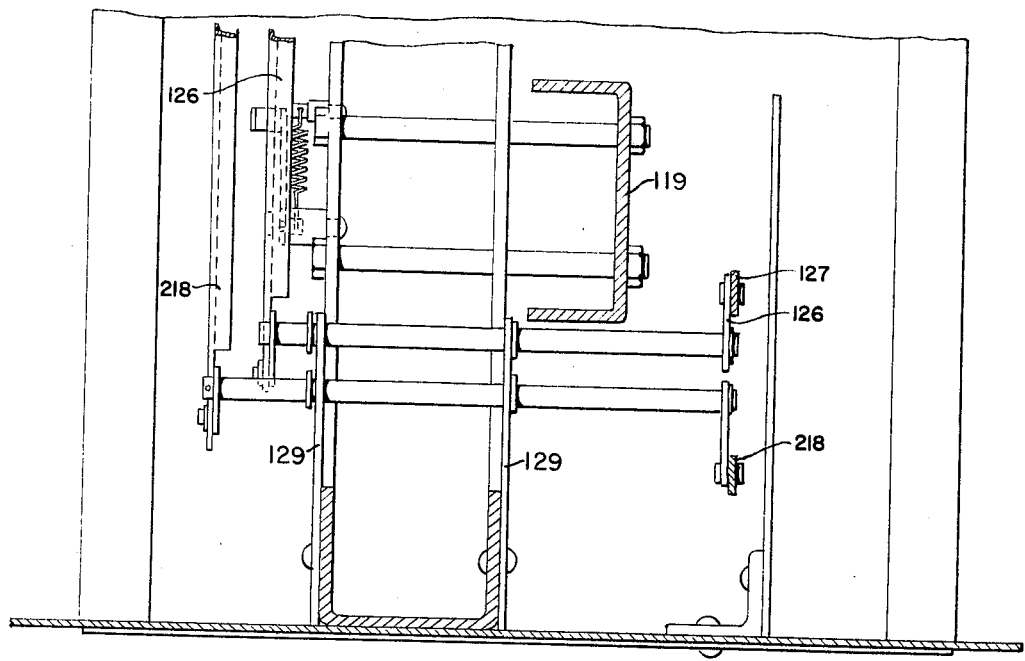
Figure 33:
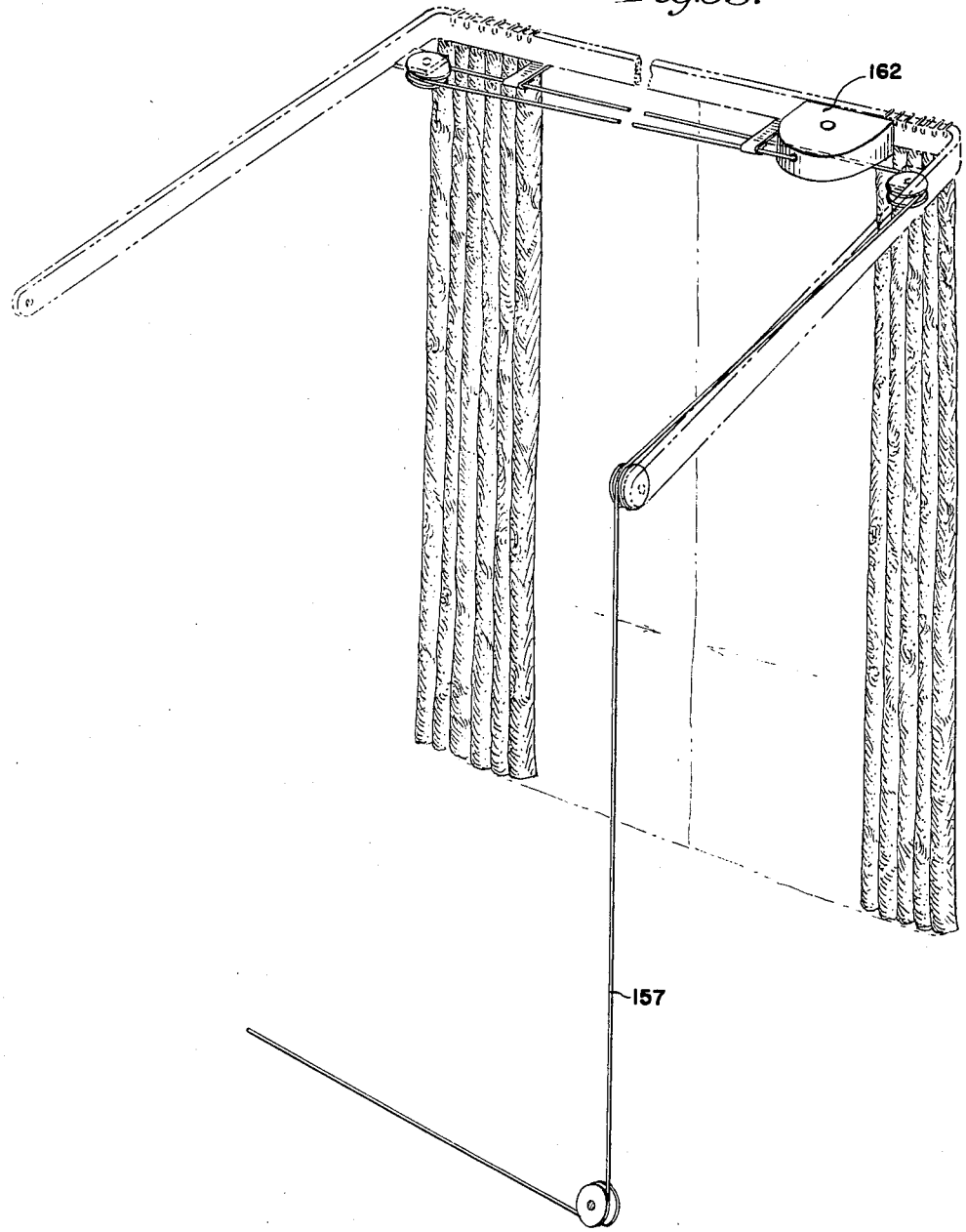

FIG. 19 corresponds to FIG. 18 but shows the mechanism in the process of recording the vote;

FIG. 20 is a fragmentary front elevational view of the entrance control linkage and the public counter actuating mechanism; showing the mechanism in non-vote or locked position;

FIG. 21 is a fragmentary enlarged scale sectional view taken on line 21—21 of FIG. 6;

FIG. 22 illustrates portions of the mechanism of FIGS. 9 and 20 but shows the entrance control device in locked or non-vote position;

FIG. 23 corresponds to FIG. 22 but shows the mechanism in the vote or "open" position;

FIG. 24 is a fragmentary enlarged scale view as suggested at line 24—24 of FIG. 8;

FIG. 24 is a fragmentary sectional view taken as suggested along line 25—25 of FIG. 24;

FIG. 26 is a fragmentary sectional view taken as suggested by line 26—26 of FIG. 6;

FIG. 27 is an enlarged scale fragmentary sectional view taken on line 27—27 of FIG. 8;

FIG. 28 is a sectional view taken on line 28—28 of FIG. 27;

FIG. 29 is a sectional view taken as indicated by line 29—29 of FIGS. 6 and 27;

FIG. 30 is a sectional view taken on line 30—30 of FIG. 29;

FIG. 31 is a sectional view taken on line 31—31 of FIG. 27;

FIG. 31A is an enlarged scale fragmentary section taken on line 31A of FIG. 31;

FIG. 32 is a sectional view taken on line 32—32 of FIG. 20;

FIG. 33 is a fragmentary perspective view illustrating a portion of the curtain control spring and control cable system; and FIG. 34 is a schematic diagram of the electrical control system of the machine.

THE MACHINE GENERAL ARRANGEMENT

The machine is housed within a readily closable and locked cabinet, and is lightweight and compact and of rugged form and therefore easily portable. To prepare the machine for use, the front door panels are swung open to parallel outstanding attitudes, and are then held in place by a top crossbar and curtain rod mechanism. A pair of curtains suspend from the curtain rod and are connected to a pull cable system which in turn is operably connected to an electric-motor drive system which is operable by the election official when the voter enters the machine, to simultaneously close the curtains and unlock the vote selecting and registering mechanisms of the machine. Then, when the control device is actuated by the voter the voter's selections are registered and the curtains open to permit the voter to exit from the machine. Thus, the door panels and curtain arrangements provide means totally enclosing the voter throughout the period when he is operating the vote selection mechanism and when his selections are being registered, thereby insuring complete voting privacy.

When the voter enters the machine he faces a coordinately arranged panel presenting to view a multitude of possible vote choices, which for example may include vertically-horizontally aligned party and candidate representations, and/or questions or propositions, or the like. In front of the panel stands a vertically elongate frame piece which is manually movable from side-to-side across the voting panel area and carries a vertically slidable vote selector device having a handle thereon for manual control by the voter so that he may sweep the entire voting panel area with the vote selector. Upon placement of a position indicator portion of the selector over the target on the panel which corresponds to the desired vote, the machine is thereby set for subsequent recording of the desired vote. Actuation of the master control device will then cause the machine, in sequence, to record the desired vote; return the vote selector device to its "home" position; and then finally open the curtains, thereby permitting the voter to exit from the machine. The voter control device and the vote selector device are both normally locked in their "home" positions by latches which are only releasable by means under control of an "entry" button which is operated from externally of the machine by an election official when the official is satisfied that the prospective voter is qualified.

At the end of the balloting period the election officials unlock the back door of the machine, whereupon the counters exhibiting the total votes cast for respective candidates are readily viewable through a transparent cover plate, which prevents tampering with the counters during the read-off process. The machine furthermore features the provision of novel and improved mechanisms which facilitate the functions of the machine hereinabove outlined, and which render the operation fail-proof and fraud-proof and automatic in every respect except for the manual selection by the voter of his desired vote.

THE MACHINE CASE AND PRIVACY CURTAIN

As best illustrated at FIGS. 1–4, the machine case includes a container-like base designated 35 which is of open-top generally rectangular box-like form. The machine per se is enclosed within a case which is designated generally at 36 and which is telescopically and vertically slidable between closed or "storage" position as shown in FIGS. 1 and 2, to the elevated operating position as shown in FIGS. 3, 4. Raising and lowering of the machine case 36 is accomplished manually by turning a hand crank as indicated at 37; the crank 37 being operative thereon through means of any suitable gear or sprocket-chain arrangement (not shown) as may be preferred. Upon raising of the machine case 36 to operative position as shown in FIGS. 3, 4, the front door panels 38—38 thereof are swung open into forwardly standing positions and a pair of draw curtains as indicated at 39—39 are mounted thereon as by means of a slide bar 39a (FIGS. 3, 5) mounted to span the upper ends of the door panels 38—38. The curtains 39—39 are connected to a pull cable system as will be explained more fully hereinafter.

VOTER ENTRANCE TO THE MACHINE

As the voter enters the machine he faces a ballot panel as indicated generally at 40. The election officer then actuates a switch which causes the curtains 39—39 to close and the vote selector to be unlocked. After making his selection as will be explained hereinafter, the voter actuates a master control button, which causes his selection to be registered; the vote selector to return to "home"; and the privacy curtains to be opened; thus permitting his exit from the machine; all of which will be explained in further detail hereinafter.

THE BALLOT PANEL

As shown by way of example at FIG. 5 in the drawing herewith, the ballot panel 40 carries a plurality of vertical track devices 42 into which are slip-fitted vertical ballot strips 44 bearing in each case a column identifying numeral and a party designation, and therebelow a succession of candidate names (or other voter choice indicia). Each ballot strip is preferably fronted by a companion transparent cover strip 45 (FIG. 29) upon which appear target areas designated 46 (FIG. 27) corresponding to each candidate name block; the target areas being so located that when the vote selector position indicator (as will be explained more fully hereinafter) is aimed at the target corresponding to the voter's choice, the desired vote will be set up. To facilitate insertion of ballot strips incidental to each new election, the ballot board 40 may be simply tilted forwardly on its bottom edge relative to a support sill 48 (FIGS. 5, 8, 13, 29) forming a portion of the machine frame, whereby the top ends of the tracks behind the transparent cover strips 45 are conveniently disposed for removal and insertions of ballot strips.

THE COUNTER BANK

As shown in FIGS. 7, 8, 29, 31, a bank of totalizing counters as indicated generally at 50 is carried across the rear of the machine, in parallel congruence to the ballot panel. The bank 50 comprises a plurality of vertically disposed "columns" of counters indicated individually at 52; each column comprising a plurality of like counter units individually indicated at 55. The counters 55 are thereby disposed in correspondence with each candidate name block and spaced therebehind. The counters 55 may be of any desired type operable by reciprocating in-line motion, and as shown herein each counter has a plunger 56 (FIGS. 8, 29, 31) extending therefrom for actuation by a "slave" vote actuator as indicated generally at 58 which is vertically slidable on a post 60 which is mounted to extend vertically by means of brackets 61—61 from the rear wall of a rectangular frame member 62. The frame 62 is suspended by two sets of rollers 64—64 (FIGS. 8, 27, 29) running on rails 66—66 suspended from the ceiling structure of the machine case by means of hangers 68; whereby the frame is horizontally movable inside the machine case from right to left as viewed in FIG. 3.

THE VOTER SELECTOR

The vote selector is indicated generally at 70 (FIGS. 3, 5, 6, 8, 27, 31) and includes a C-shaped bracket 72 (FIG. 31) which slidably mounts as indicated at 73—73 upon a vertically slotted front main plate 74 (FIGS. 3, 5, 6, 17, 27, 28, 29, 31) the main plate being mounted at its top and bottom ends relative to the frame 62 by means of brackets 76—76 so as to stand forwardly thereof in parallel relation to the rear post 60. The frame structure 62 is completed by means of vertical angles 77—77 and top and bottom plates 78—78. Thus the vote selector 70 is arranged to be manually shifted vertically on the main plate 74 while the frame 62 is shiftable horizontally on the tracks 66—66, thus permitting the vote selector to traverse the horizontal and vertical extents of the voting panel. A handle 80 (FIGS. 3, 5, 6, 8, 31) may be provided as shown to facilitate manual displacements of the selector unit by the voter, as desired. Thus, it will be appreciated that the support frame 62 vertically encompasses the ballot panel 40 while being in horizontally free sliding relation therewith, and that the selector 70 is also free to be manually moved vertically on the main plate 74.

The selector 70 is interconnected with the slave actuator 58 so that they move vertically in consonance, one with the other. As shown in FIG. 29, a suitable type of interconnection comprises an endless cable device as indicated at 82 which is fixed to the selector 70 as indicated at 83 (FIG. 31). The cable 82 may be of conventional flexible type so as to readily negotiate turns about guide pulleys 84 carried by the frame 62. As shown at 86 the cable 82 is fixed to a companion cable 88 (FIG. 29) which trains around guide pulleys 89—89. The cable 88 connects to the slave voter actuator 58 which rides on the vertical post 60. The actuator 58 is best shown at FIGS. 29–31 to carry a counter "pusher" 90 which is displaceable rearwardly thereon by means of a vertically standing control rod 92. The rod 92 is carried at its opposite ends by means of crank arms 93—93 which extends from and are keyed to the post 60. Hence, the slave actuator 58 is freely movable vertically on the post 60 and the rod 92, while rotation of the post 60 will cause the pusher 90 to thrust rearwardly into operating relation against the counter part 56 corresponding to the position of placement of the vote selector 70 on the ballot panel 40.

The selector 70 includes a transparent arm portion 95 (FIGS. 27, 31) which extends laterally behind the main plate 74 and carries a target area 96 adapted to be brought by the voter into positional registry with the target area 46 on the ballot which corresponds to the vote selection he wishes to make. To vertically maintain the selector 70 at the voter-selected position, a detent bar 98 is mounted as shown at FIGS. 27, 31, 31A to extend in parallel relation in front of the main plate 74 and is formed with an undulant vertical profile as indicated at 99 for engagement with a pair of rollers 100—100 which are carried on axles 102—102 which are in turn supported at their opposite ends in slide-slot portions 103—103 of bearings 104—104 carried in opposite ends of a U-shaped bracket 105 fixed to the selector unit 70. A pair of pressure beams 106—106 span the axles of the rollers 100—100 and are spring-biased as indicated at 108—108 to urge the rollers 100—100 against the edge 99 of the bar 98. The parts are so arranged that whenever the selector is disposed vertically to correctly align target 96 with any one of the targets 46, the rollers 100 will reside in dwell portions of the profile of the bar 98, thereby holding the selector at the intended level. In fact, the device is so designed as to automatically assist the voter in accurately registering his selector target on his intended vote selection.

As shown in the drawing, and particularly at FIGS. 27, 31, the vertically slotted main plate 74 is covered by a shell-like housing 110 which is centrally apertured at 112 to provide a vertically extended window through which only one column of candidate names may be visible at one time. A transparent window pane 114 is provided to protect the internal mechanism.

To insure holding of the selector device in any selected horizontal position relative to the ballot format, a constant friction device in the form of a roller 116 (FIGS. 13, 25, 26, 27, 29) is provided. The roller is spring-biased as indicated at 117 to run against a track 118 carried by a channel 119 comprising part of the machine frame. The lower end of the frame 62 is positionally stabilized by means of paired rollers 120—120 riding against a vertical guide rail 121; the rollers 120 being carried by a bracket 122 extending from the frame bottom plate 78.

VOTER ACTUATION OF THE MACHINE

After a qualified voter enters the machine the election official attending the machine pushes an "entrance button" as shown at 125 (FIGS. 6, 7, 21–23) operates a bell crank and linkage system 126 to push a strut 127 so as to swing open a latch 128 which previously locked against a pin 130 carried by a crank arm 131 keyed to a main operating shaft 132. The linkage system 126 is carried by brackets 129. The shaft 132 carries a worm gear 133 which is arranged to be driven by a worm 134 comprising the power output portion of an electric motor and gear reduction system indicated generally at 135. The motor system 136 is controlled by a switch 138 which is actuated by a stud 139 carried by the bar 127 (FIG. 20) when the entrance button 125 is pressed in. As shown at FIG. 34, when the switch 138 is actuated it sets up a circuit which is held closed by a relay 140 until the mechanism causes the privacy curtains to be closed and the voting selector frame 62 to be unlocked, thereby permitting the voter to set up his vote selection. When this is accomplished the crank arm 131 operates another switch 141 which opens the motor power supply circuit. Then, after the voter makes his selection as explained hereinabove, he presses an "exit" switch 142 which locks in a relay 143 (FIG. 34) energizing the motor to drive the gear in reverse direction. This causes the vote selection to be registered and the selector frame 62 to be returned to its "home" position, and the curtains to be opened, as will be more fully explained hereinafter. When the crank arm 131 returns to its "home" position it operates another switch 144 which reopens the motor circuit.

As stated hereinabove, when the "entrance button" 125 is pressed and the gear 133 starts to rotate, this turns the shaft 132 which carries a casting indicated generally at 145 (FIGS. 10, 12). The casting carries pin 146 which receives in slidable and rotatable relation thereon the forked end portion 147 of a rocker arm 148 which pivots as shown at 149 on a stationary structure of the machine. At its other end the rocker pivotally connects to a push-pull rod 150 which displaces a slide-cam 151 engaging a roller 152 carried by a vertically shiftable lock latch 153 which is biased toward locking position by a spring 154. At its lower end the latch 153 is bevelled to engage in a slotted portion of the selector frame 62 (FIG. 10) to normally hold the frame against horizontal shifting. When the latch is raised the selector is free for use by the voter. When the selector returns to its "home" position, thereby completing a voting cycle, the bevelled end of the latch 153 is initially cammed upwardly to permit the frame to pass it and then to be spring-locked by the latch (FIG. 24) until subsequently released again by the election office.

As the crank 131 rotates in clockwise direction as shown in FIG. 9 from "A" to "B" as explained hereinabove upon pressing of the "entrance button," it carries with it an arm 155 which draws a pulley 156 with it to pull upon a cable 157 which operates the curtain closing system as shown in FIG. 33. When the arm 155 reaches position "B" (FIG. 9) its bottom flanged end portion 158 engages a spring latch 160 which then holds the curtain system in closed position. Later, when the voter operates the exit switch 142 the shaft 132 rotates in counterclockwise direction and carries with it only the crank 131 and not the arm 155. However, when the crank 131 approaches its "home" position it bears against an abutment portion 161 on the latch 160 and forces it against its spring to release the arm 155. The recoil spring 162 (FIG. 33) of the curtain control system thereupon pulls upon the cable 157 so as to open the curtains and pull the crank arm 155 back to its "home" position.

When the gear 133 rotates initially in response to operation of the entrance button 125 it rotates in clockwise direction as shown in FIG. 17 to the position shown in FIG. 18. A linkage system including bars 164, 165 and 166 pivotally connects at 167 to the gear 133 and at 168 to a crank arm device 169 extending from a striker operating shaft 170. The link 164 is rocker-mounted on the structure as shown at 171. The linkage system 164, 165, 166 is biased by a guide roller 172 carried on a spring-urged beam 173 so as to stiffen when the gear 133 counter rotates from the position shown in FIG. 18 to the position shown in FIG. 19; thereupon operating as shown in FIG. 19 to rock the arm 164 so as to pull down crank arm 169 and thereby rotate the shaft 170. This action of the shaft 170 swings a pair of arms 175—175 (FIGS. 8, 13, 17, 29) which carry the striker bar 176 so as to drive the latter rearwardly against a spring-biased push bar 178 which operates through a crank arm 179 to rotate the vertical standing shaft 60 so as to actuate the pusher 90 carried by the slave actuator 58, as explained hereinabove. Thus, when the gear 133 rotates in counterclockwise relation as shown in FIG. 19 the voter's selection is registerd in th counter system. The striker bar 176 is returned "home" in response to return operation of the linkage system. The counter pusher 90 and its related mechanisms are automatically returned "home" through the action of the spring-biased push bar 178.

Incidental to reverse rotation of the main drive shaft 132 a cable 180 is provided in conjunction with a drive system which is indicated generally at 182 (FIGS. 7, 10, 24, 25, 26) and which includes a drum 184 about which the cable trains and is dead-ended thereon as indicated at 185 (FIG. 26). The drum is driven by the shaft 132 through a speed increase system 186, and the cable 180 trains around guide rollers 187 and carries a pick-up stud 188 (FIGS. 7, 25) which threads through an apertured bracket 189 carried by the base plate portion 122 of the selector frame 62, and is so arranged as to pick up the selector column after the vote has been registered as explained hereinabove, and will push it back to its "home" position before the curtains are opened. To cushion the starting impact of the pick-up stud 188 on the bracket 189 a shock absorber device as best shown in FIG. 24 is provided to comprise a pair of extension springs 190—190 which connect to pins 191—191 extending sidewise from the bracket 189 and connect at their other ends to pins 192—192 carried by the base plate 122 of the selector frame. As shown in FIGS. 24, 25, a spring-biased shock absorber rod 193 is mounted to be longitudinally slidable relative to the frame bottom plate 122, and is spring-biased to extend therefrom into bumping relation with a rubber block 194 carried by the machine frame when the selector unit 62 arrives at its "home" position; thereby cushioning home-return impacts of the selector frame against the machine frame.

CONVERSION TO MANUAL OPERATION

In the event of an electric power supply failure the machine is readily convertible to manual operation with utmost ease and facility. A change-over control knob 195 (FIGS. 5, 6, 14, 15) is provided on the front of the machine and is normally locked against operation by means of a lock 196 to insure only proper use thereof. Shifting of the knob 195 from left to right will open a toggle switch 198 which thereupon neutralizes the entire electric device system to insure against inadvertent exitation thereof in event the power supply is restored while the machine is in manual operation. Also, movement of knob 195 to the right pulls a link 199 to rock a link 200 on its pivot, thereby pulling upon a link 201 (FIGS. 14, 15) which draws a slide plate 202 to the left which drags a cam plate 203 with it. The plate 203 is formed with cam risers 204—204 disposed to cooperate with pillow blocks 205—205 carried on a vertically shiftable base 206. The parts are so arranged that normally the cam risers hold the worm 134 in mesh with the gear 133, but upon displacement to the left as described hereinabove the worm drops out of the mesh.

Figure 14:
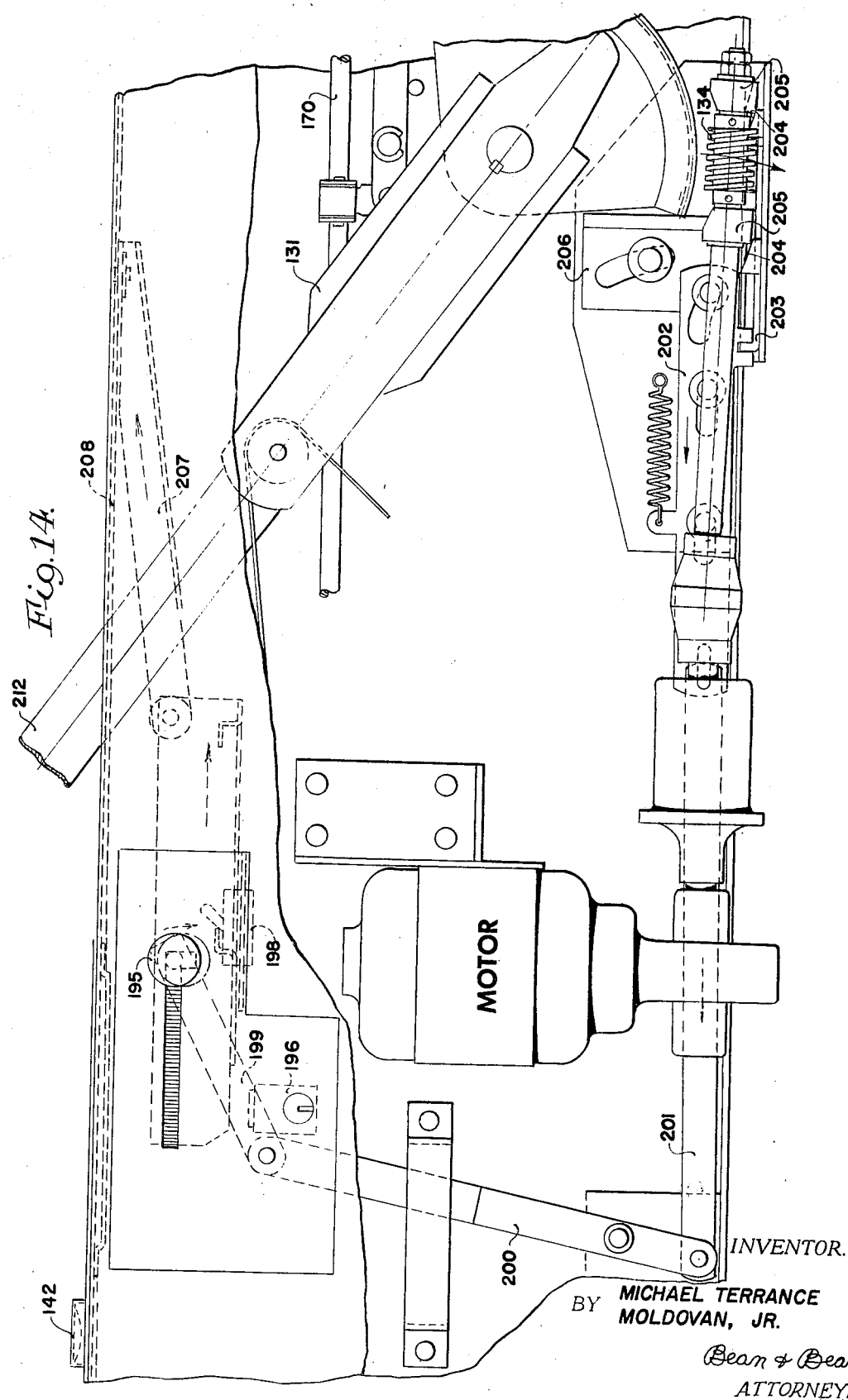
FIG. 14 is a view corresponding to FIG. 11 but illustrating the master control lever and associated mechanism set up for manual operation.

Simultaneously, with shifting of the knob 195 to the right, a push link 207 is actuated to cam forwardly and to the right a cover plate 208 which normally closes a slot 209 formed through the top wall of a front cover device which is indicated generally at 210 (FIGS. 3, 5, 8, 11). When the slot 209 is thus opened a manual operating lever 212 is inserted downwardly through the slot 209 in slide-fitted relation in the crank member 131 to extend as shown in FIG. 14. Thus, the voter may now operate the machine manually to drive the shaft 132 as in the manner described hereinabove in connection with electrical operation of the machine. Voter operation of the machine however is still under control of the election official via the "entrance button" 125 as described heerinabove. Upon restoration of the electric power supply, the machine is reconverted to electrical operation simply by reversing the steps hereinabove described to put the mechanism in the condition shown at FIG. 11.

THE PUBLIC COUNTER

As indicated at 215 (FIGS. 4, 6, 7, 23) a four-digit counting unit is mounted on the machine case to be visually readable, from externally thereof. The device is arranged to accumulate one count each time the machine cycles, whether the voter has selected a candidate or not. For this purpose, a bell crank 216 is provided to engage pin 130 on crank 131 every time the crank reaches position "B" on FIG. 9. The crank 216 is a linkage system 218 which connects to the driver 219 of the counter 215. Motion of the driver in one direction advances the counter unit wheel 18°, and return operation of the driver 219 advances it the required remaining 18° to cause the wheel to accumulate one count. Thus, the counter 215 will record the total number of persons who have used the machine during any voting day, whether they voted for a candidate or not.

SAFEGUARDS

As shown at FIGS. 8, 13, 15, 20, 27, an endless closure tape 220 is provided to close the gap between the front cover 210 and the ballot panel 40. This tape deadends on the selector frame 62 as shown at 222 and 223 (FIG. 27) and trains around idlers 224 (FIGS. 7, 20) whereby the tape travels with the selector frame 62 as it moves horizontally relative to the ballot panel 40. Thus, unlicensed access to the interior mechanism is at all times precluded. Securty panels 226 and 227 (FIG. 7) are provided for installation at the opposite ends of the transparent counter covering panel to lock the latter in place and to prevent any fraudulent access to the counters, while permitting them to be scanned. The security panels 226, 227, are held in place by latches 228—228, including provisions for wire seals as indicated at 229—229 to be used in conjunction therewith.

To prevent operation of the machine prior to official opening of the polls, and upon closing of the polls, a key-controlled lock as indicated at 230 (FIGS. 4, 6, 21) is provided to block motion of the linkage system 126 via a crank 231 which is pivoted on a stationary part and is spring-biased to engage a slotted bracket 232 extending from the linkage 126. When the key is operated the crank 231 is forced out of blocking engagement with the mechanism.

To insure complete operation of each voting cycle as explained hereinabove, and to prevent any reversals of the drive mechanism movements in either direction until each phase of the machine unlocking and vote registering and selector return and curtain operating functions are fully completed, a "full stroke" monitoring device is employed. As shown herein this device comprises a housing 233 pivotally mounted on a fixed bracket 234 by means of pin 235 (FIGS. 10, 10A). Housing 233 includes a cam slot 236 to accommodate one end of a toggle control crank 237 which is spring-biased by means of tension springs 238—238 to float in alignment with an anchoring yoke 239 extending from the fixed bracket structure. The housing 233 carries a pair of dogs which are adapted alternatively to engage the notched periphery of the segment 145 when the housing is swung in the direction of segment movement, due to the pull of the spring-toggle device on the housing through the cam slot connection therewith. A pair of toggle control lugs 240—240 are carried by the segment 145 in spaced relation on the periphery thereof, and the parts are arranged so that when the shaft 132 is being rotated in either direction the housing dogs prevent the shaft from being reversed until the shaft reaches the end of its intended range of movement. At that time one of the control lugs 240 moves into bearing relation against the housing and trips it into an opposite attitude, freeing the segment 145 to rotate in opposite direction; while the other dog portion of the housing is now so disposed as to prevent the segment from being reversed until it reaches the opposite end of its new intended range of travel.

OFFICIAL CLOSING OF THE POLLS

At the close of the polling period the President of the Voting Bureau locks the machine against further use by locking the "entrance button" by means of lock 230. He then closes and locks the front doors, and then unlocks and opens the rear doors. This exposes to view the readout portion of the candidate counters, whereby the totals for each candidate may be scanned and recorded. The counters are easily resettable by the machine custodian to zero readings anytime prior to preparation of the machine for use in a subsequent election.

Thus, it will be apparent that the machine of the present invention embodies important improvements with respect to the voter-operable control devices, facilitating use of the machine by inexperienced voters. In this respect reference is made to the improved vote selector column and slide arrangement; the improved automatic centering device insuring "on target" settings of the manually moved selector; simplified actuation of the selector to cause a vote to be registered; and improved mechanical-electrical drive mechanisms and overall security provisions. Also, it will of course be appreciated that whereas only one specific machine design of the present invention is illustrated and described in detail hereinabove, various changes may be made therein without departing from the spirit of the invention or the scope of the following claims.

What is claimed is:

1. In a voting machine, a voting panel presenting to the voter's view vertically and horizontally coordinated columns and rows of candidate name spaces, a vote registering counter disposed in association with each said candidate name space, a vote selector frame device disposed in front of said panel and mounted to be movable relative thereto in horizontal directions to sweep the entire width of said panel, and a vote selector pointer device carried by said frame and vertically movable thereon by the voter to shift said pointer device into registry with a selected one of said candidate name spaces, and wherein said frame carries a multiple cam device extending vertically thereof for cooperation with spring-pressed roller means carried by said pointer device for automatically biasing said pointer device to rest in precise registry with any voter-intended candidate name space.

2. In a voting machine, a voting panel presenting to the voter's view vertically and horizontally coordinated columns and rows of candidate name spaces, a vote registering counter disposed in association with each of said name spaces, a vote selector device disposed in front of said panel and movably mounted relative thereto so as to sweep the entire area of said panel into registry with a selected one of said candidate names spaces, handle means on said selector device for allowing a voter so to move said selector device to position it at least in proximity with a voter-selected name space, actuator means movable by said selector device into registry with a particular counter associated with said voter-selected name space when said selector device likewise is registered with said selected name space, and means for automatically biasing said selector device to rest in precise registry with said voter-selected name space whenever said selector device is moved by the voter into close proximity with said voter-selected name space.

3. In the voting machine as defined in claim 2 including drive means for operating said actuator means and then positioning said vote selector device in a non-voting position, and a control switch operable by the voter to energize said drive means.

4. In a voting machine, in combination,
a voting panel presenting to the voter's view orthogonally coordinated rows of candidate name spaces,
a vote registering counter disposed in association with each of said name spaces,
a vote selector device disposed in front of said panel and movable in one orthogonal direction relative thereto, said vote selector device including an elongate member extending in the other orthogonal direction, said member having a window space therein of a width to expose therethrough only one row of name spaces at a time whereby to allow a voter visually to register said member in alignment with a selected row which extends in said other direction, a selector mounted for movement along the length of said member and including a portion exposed through said window to sweep the name spaces of the selected row, and actuator means positioned by said selector for registry with a selected one of those vote registering counter associated with the name spaces of said selected row,
means for automatically biasing said selector to rest in precise registry with a voter-selected name space within said selected row adjacent which said portion of the selector has been roughly positioned by the voter, whereby said actuator means is registered automatically with that vote registering counter associated with said voter-selected name space in said selected row.

5. In the voting machine as defined in claim 4 including drive means for operating said actuator means and then positioning said vote selector device in a non-voting position, and a control switch operable by the voter to energize said drive means.

6. In the voting machine as defined in claim 4 wherein said means comprises a multiple cam device carried by and extending lengthwise along said member, and spring-biased means carried by said selector and engaging said cam device.

7. A voting machine comprising, in combination, a panel presenting thereon to the voter coordinately arranged rows and columns of vote selection spaces adapted to accommodate party and candidate designating labels, a vote selector adapted to be manually moved by the voter to sweep said panel and to be set by the voter in association with a selected vote selection space on said voting panel, a count totalizing device positionally associated with each of said vote selection spaces, means for operatively interconnecting said voting selector with that count totalizing device associated with the voter selected vote selection space, said means including a motor and drive means for sequentially operating the count totalizing device associated with the voter selected vote selection space and then returning said vote selector to a non-voting position, a voter control switch operable by the voter and coupled to said motor whereby operation of said voter control switch causes actuation of said selected count totalizing device to register its designated vote selection and restoration of said voting selector to said non-voting position means normally locking said selector against manual movement in said non-voting position, and an official control device operable by an election official to release said means normally locking said selector whereupon the latter may be manually shifted from said non-voting to a voting position.

8. A voting machine as set forth in claim 7 wherein said drive means includes a manual drive lever and mechanism which may be disengaged to allow manual operation by means of said drive lever.

9. A voting machine as set forth in claim 7 which includes a privacy curtain device operable automatically upon actuation of said official control device and release of said means normally locking said selector to enclose the voter and to shield from external view his vote selections.

10. A voting machine as set forth in claim 9 wherein actuation of said voter control switch causes said privacy curtain device to open for free exit of the voter.

11. In a voting machine, a voting panel presenting a network of voting spaces representing a plurality of candidates, a bank of counters including a vote registering counter disposed in association with each of said spaces, a vote selector device disposed in front of said panel and mounted relative thereto to be manually movable in directions universally parallel to the plane thereof to sweep all of said voting spaces and to be set at a vote selection position thereon, latch means for locking said selector device in a non-voting position, a counter actuator carried by support means disposed between said panel and said bank of counters to be universally movable in directions parallel to the plane of said bank of counters, motion transmitting means interconnecting said selector and said actuator to cause the latter to positionally shift relative to said bank of counters in consonance with positional movements of said selector relative to said voting panel, a member carried on said actuator and projectible therefrom to operably cooperate with and advance that one of said counters which corresponds to a selected one of said voting spaces, normally open draw curtain means closable to screen from public view the vote selecting operation, first control means for manual operation by an official to close said curtain means and to unlock said selector for manual movements thereof by a voter during a vote selecting operation; and second control means operable by the voter at the end of the vote selecting operation to automatically cause, in sequence, the selected candidate counter to register a single vote and the vote selector to return to latched non-voting position and finally the curtain means to open for exit of the voter.

12. In a voting machine, a voting panel presenting coordinately arranged voting spaces representing a plurality of candidates, a bank of counters including a vote registering counter disposed in association with each of said spaces, a vote selector device disposed in front of said panel and mounted relative thereto to be manually movable in directions universally parallel to the plane thereof to sweep all of said voting spaces and to be set at a vote selection position thereon, means normally locking said selector device in a non-voting position, a counter actuator carried by support means disposed between said panel and said bank of counters to be universally movable in directions parallel to the plane of said bank of counters, motion transmitting means interconnecting said selector and said actuator to cause the latter to positionally shift relative to said bank of counters in consonance with positional movements of said selector relative to said voting panel, a member carried on said actuator and projectible therefrom to operably cooperate with and advance that one of said counters which corresponds to a selected one of said voting spaces, means for manual operation by an official to unlock said selector for manual movements thereof by a voter during a vote selecting operation; and means operable by the voter at the end of the vote selecting operation to automatically cause, in sequence, the selected candidate counter to register a single vote and the vote selector to return to and to be locked in non-voting position.

References Cited

UNITED STATES PATENTS

| 2,284,144 | 5/1942 | Gustavson | 235—51 |
| 2,575,725 | 11/1951 | McKay | 312—312 |
| 2,943,786 | 7/1960 | Swanson | 235—50 |
| 3,181,785 | 5/1965 | Laws et al. | 235——51 |
| 3,233,826 | 2/1966 | Wiken. | |

RICHARD B. WILKINSON, Primary Examiner

S. A. WAU, Assistant Examiner